(12) United States Patent
Kaneko et al.

(10) Patent No.: US 8,488,008 B2
(45) Date of Patent: Jul. 16, 2013

(54) IMAGE PICKUP APPARATUS AND CAMERA SHAKE CORRECTING APPARATUS APPLIED TO IMAGE PICKUP APPARATUS

(75) Inventors: Shuhei Kaneko, Hino (JP); Keita Takahashi, Sagamihara (JP); Masaki Higashiyama, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 679 days.

(21) Appl. No.: 12/629,459

(22) Filed: Dec. 2, 2009

(65) Prior Publication Data
US 2010/0188516 A1 Jul. 29, 2010

(30) Foreign Application Priority Data

Jan. 28, 2009 (JP) .................................. 2009-017357
Jan. 28, 2009 (JP) .................................. 2009-017360

(51) Int. Cl.
*H04N 5/228* (2006.01)
(52) U.S. Cl.
USPC .................. 348/208.7; 348/208.4; 348/208.3; 348/208.99
(58) Field of Classification Search
USPC .............................. 348/208.99, 208.2–208.16
See application file for complete search history.

(56) References Cited

U.S. PATENT DOCUMENTS

| | | | | |
|---|---|---|---|---|
| 5,194,993 A | * | 3/1993 | Bedzyk | 359/813 |
| 5,546,147 A | * | 8/1996 | Baxter et al. | 396/349 |
| 5,748,391 A | * | 5/1998 | Tanaka et al. | 359/813 |
| 5,781,806 A | * | 7/1998 | Satoh et al. | 396/55 |
| 5,842,053 A | * | 11/1998 | Ueyama et al. | 396/55 |
| 6,332,060 B1 | * | 12/2001 | Miyamoto et al. | 396/55 |
| 7,440,687 B2 | * | 10/2008 | Seo | 396/55 |
| 2003/0035228 A1 | * | 2/2003 | Takanashi | 359/819 |
| 2005/0110873 A1 | * | 5/2005 | Enomoto | 348/207.99 |
| 2006/0055787 A1 | | 3/2006 | Hirota et al. | |

(Continued)

FOREIGN PATENT DOCUMENTS

| | | |
|---|---|---|
| GB | 2420926 A | 6/2006 |
| JP | 10-026785 A | 1/1998 |

(Continued)

OTHER PUBLICATIONS

Preliminary European Search Report dated Apr. 28, 2010 (in English) in counterpart European Application No. 09014902.2.

(Continued)

*Primary Examiner* — Lin Ye
*Assistant Examiner* — Chia-Wei A Chen
(74) *Attorney, Agent, or Firm* — Holtz, Holtz, Goodman & Chick, P.C.

(57) ABSTRACT

An image pickup apparatus includes a lens barrel unit having a photographing optical system, an image pickup unit that is displaced two-dimensionally to correct camera shake, a FPC that has a first extending section connected to the image pickup device and extending on a surface of the lens barrel unit and a second extending section that is bent at an end of the first extending section and fixed to the surface of the lens barrel unit, and a guide plate that guides the first extending section on the surface of the lens barrel unit, wherein when the image pickup unit moves in an X direction, a bent section is bent to absorb an amount of movement in the X direction, and when the image pickup unit moves in a Y direction, the first extending section bends to absorb an amount of movement in the Y direction.

3 Claims, 18 Drawing Sheets

U.S. PATENT DOCUMENTS

| | | | |
|---|---|---|---|
| 2006/0082658 A1* | 4/2006 | Lee et al. | 348/208.7 |
| 2006/0132613 A1* | 6/2006 | Shin et al. | 348/208.7 |
| 2007/0081820 A1* | 4/2007 | Izumi et al. | 396/448 |
| 2007/0081821 A1* | 4/2007 | Izumi et al. | 396/448 |
| 2007/0182824 A1 | 8/2007 | Nomura et al. | |
| 2008/0303907 A1* | 12/2008 | Lee | 348/208.7 |
| 2009/0002500 A1* | 1/2009 | Kawai et al. | 348/208.11 |
| 2009/0027507 A1* | 1/2009 | Kobayashi et al. | 348/208.11 |
| 2009/0027510 A1* | 1/2009 | Yumiki | 348/222.1 |
| 2009/0047009 A1* | 2/2009 | Nagano | 396/55 |
| 2009/0086037 A1* | 4/2009 | Chang et al. | 348/208.7 |
| 2009/0091632 A1* | 4/2009 | Okamoto et al. | 348/208.7 |
| 2009/0135260 A1* | 5/2009 | Rouvinen et al. | 348/208.11 |

FOREIGN PATENT DOCUMENTS

| | | |
|---|---|---|
| JP | 2006-191249 A | 7/2006 |
| JP | 2008-048220 A | 2/2008 |
| JP | 2008-191267 A | 8/2008 |
| WO | WO 2007063360 A1 * | 6/2007 |

OTHER PUBLICATIONS

Extended European Search Report (EESR) dated Mar. 30, 2011 (in English) in counterpart European Application No. 11001460.2.
Japanese Office Action dated Aug. 7, 2012 issued in counterpart Japanese Application No. 2009-017360.

* cited by examiner

IMAGE PICKUP APPARATUS AND CAMERA SHAKE CORRECTING APPARATUS APPLIED TO IMAGE PICKUP APPARATUS

CROSS REFERENCE TO RELATED APPLICATIONS

This application claims the benefit of Japanese Applications No. 2009-017357 filed in Japan on Jan. 28, 2009, and No. 2009-017360 filed in Japan on Jan. 28, 2009, the contents of which are incorporated herein by this reference.

BACKGROUND OF THE INVENTION

1. Field of the Invention

The present invention relates to an image pickup apparatus provided with a camera shake correcting apparatus capable of driving a frame member holding an image pickup device to be displaced within a two-dimensional plane.

2. Description of the Related Art

Conventionally, in an image pickup apparatus applying an image pickup device such as a digital camera having a camera shake correcting function, an image pickup unit mounted with an image pickup device such as a CCD incorporates a camera shake correcting apparatus built in a lens barrel so as to be shift-movable within a plane orthogonal to an optical axis of a photographing optical system, that drives the image pickup unit to be displaced within the above described plane so as to correct detected camera shake.

The above described image pickup device is disposed on the image pickup unit by being mounted on a flexible printed circuit for connection of an image pickup device (hereinafter described as "CCD connection FPC"). Therefore, the above described CCD connection FPC needs to be supported in such a way that the FPC can be bent and deformed so as to allow the above described shift movement of the image pickup unit without producing resistance when the photographing unit moves on the above described plane.

SUMMARY OF THE INVENTION

An image pickup apparatus of the present invention includes a lens barrel unit having a photographing optical system, a movable unit having an image pickup device for converting a luminous flux from the photographing optical system to an electric signal, that corrects camera shake by being two-dimensionally displaced on a plane orthogonal to an optical axis of the photographing optical system, a flexible printed circuit having a first extending section connected to the image pickup device disposed on the movable unit, that extends on a first, outer surface of the lens barrel unit along the photographing optical axis and a second extending section bent in a direction orthogonal to the photographing optical axis at an end of the first extending section, that extends over a second outer surface and is fixed to the second outer surface, and a guide member that guides the first extending section of the flexible printed circuit on the first outer surface of the lens barrel unit, wherein when the movable unit moves in a first direction, a bent section of the second extending section of the flexible printed circuit bends so as to absorb an amount of movement in the first direction, and when the movable unit moves in a second direction perpendicular to the first direction, the first extending section bends between the guide member and the movable unit to absorb an amount of movement in the second direction.

A camera shake correcting apparatus of the present invention includes a lens barrel unit provided with a photographing optical system for forming an image of reflected light from an object on an image pickup device, a first movable member outside the photographing optical system, that moves in a first direction along a plane perpendicular to an optical axis of the photographing optical system with respect to the lens barrel unit, first guide means fixed to the lens barrel unit for guiding the first movable member to move in the first direction outside the photographing optical system, a second movable member provided with the image pickup device, connected at one end of the first movable member, that moves in a second direction which is a direction along a plane perpendicular to an optical axis of the photographing optical system and perpendicular to the first direction inside or in the vicinity of the photographing optical system, and second guide means disposed at one end of the first movable member along the second direction for movably connecting the second movable member to the first movable member along the second direction and preventing the first movable member from rotating with respect to the lens barrel unit.

The benefits of the present invention will be further made obvious from the following detailed explanations.

DETAILED DESCRIPTION OF THE PREFERRED EMBODIMENTS

Figure 1:
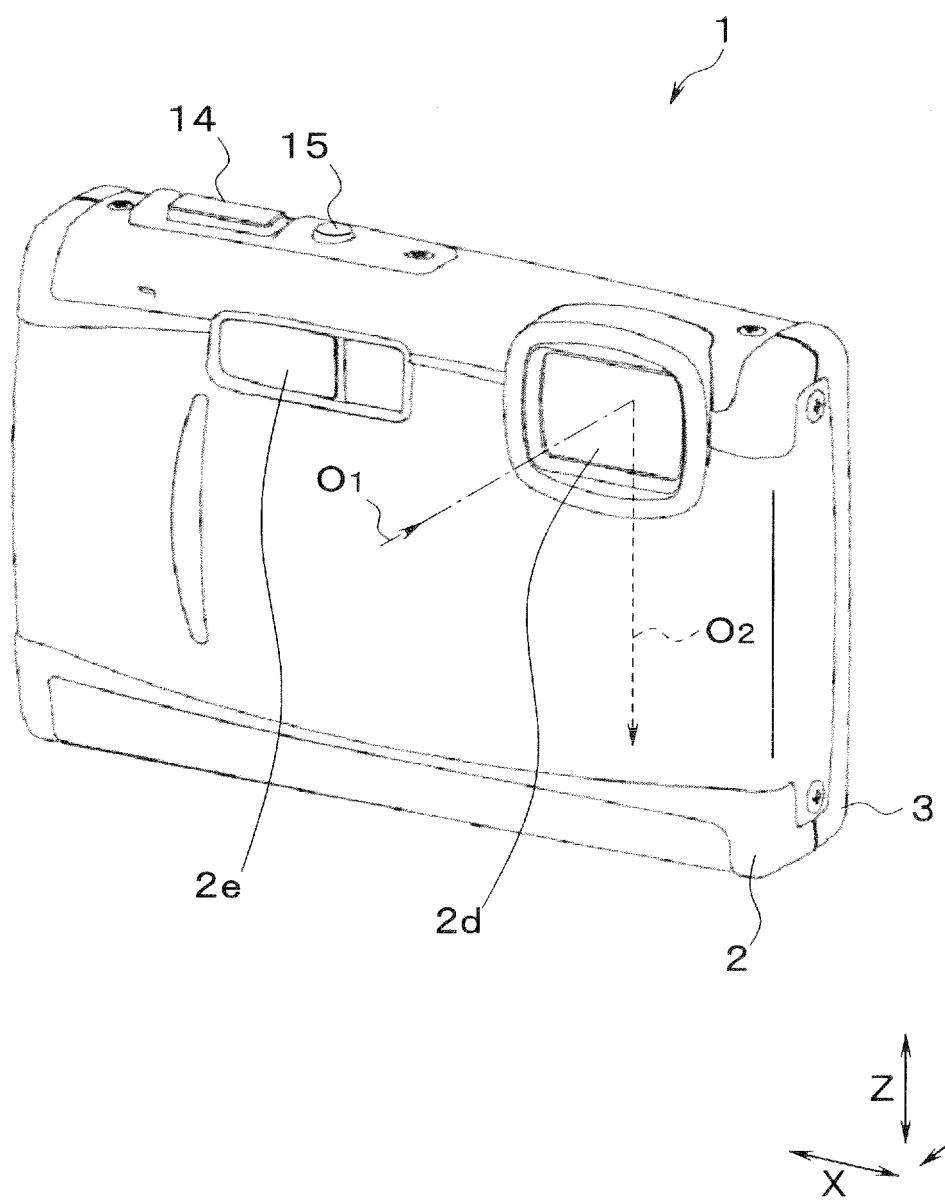
FIG. 1 is a perspective view of outward appearance of a digital camera as an image pickup apparatus according to an embodiment of the present invention as viewed from the front.
Figure 2:
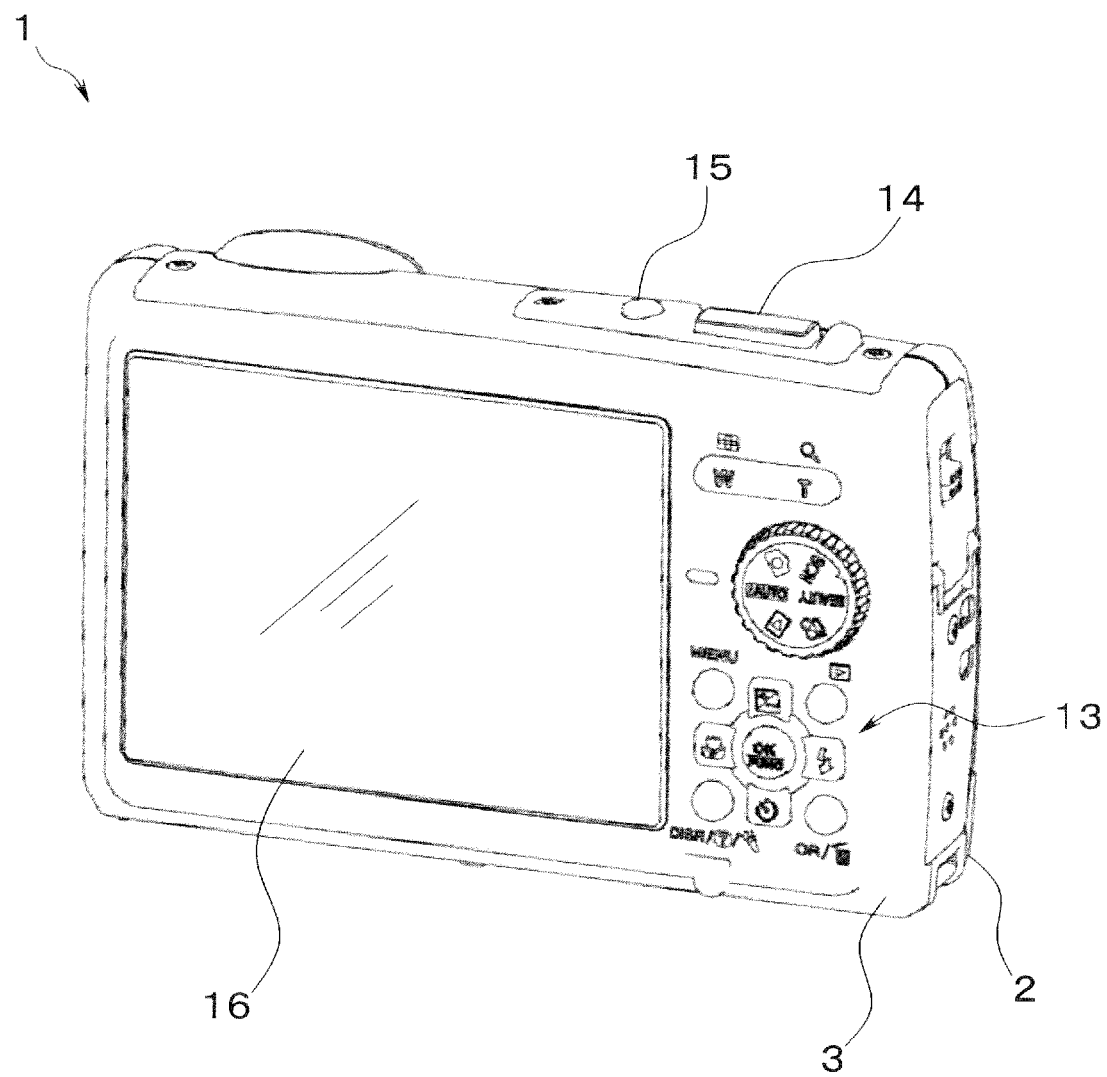
FIG. 2 is a perspective view of the outward appearance of the digital camera in FIG. 1 as viewed from the back.
Figure 3:
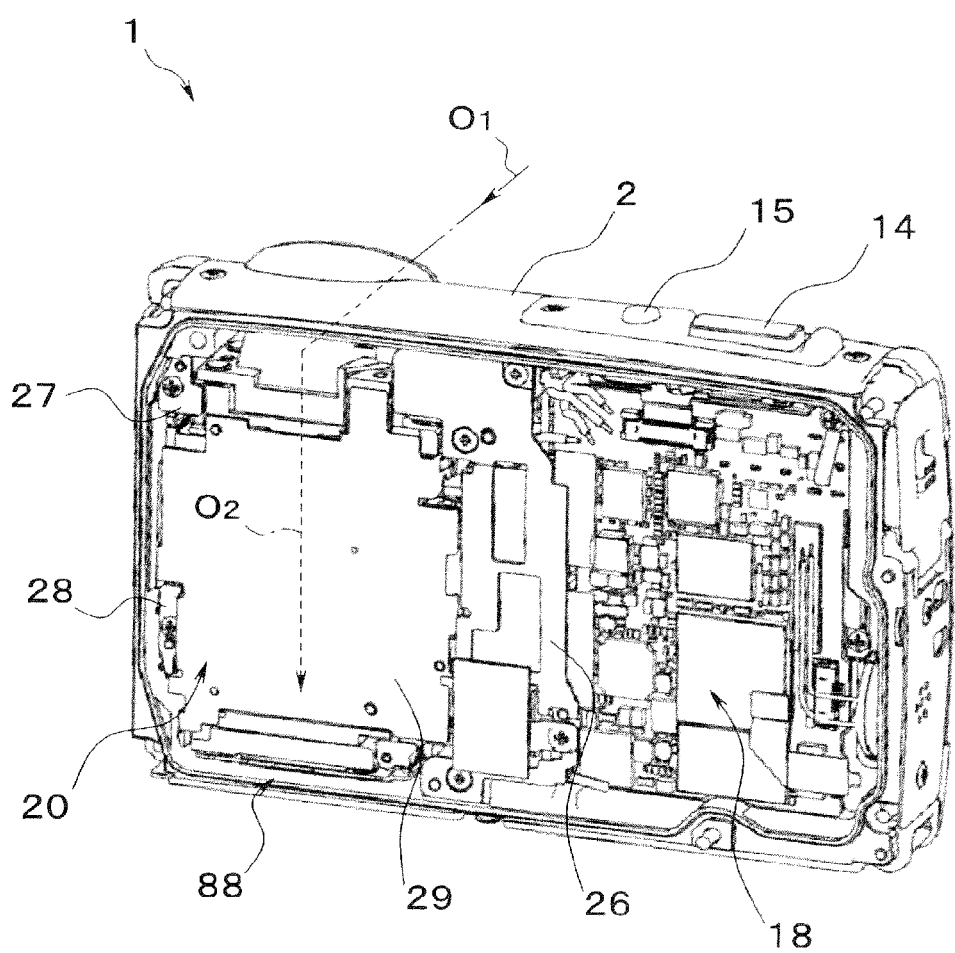
FIG. 3 is a rear view of an internal arrangement of the digital camera in FIG. 1 with the rear cover removed.

A digital camera 1 which is an image pickup apparatus according to an embodiment of the present invention is a compact digital camera incorporating a lens barrel unit 20 provided with a bent optical system for picking up an image of an object and provided with a camera shake correcting apparatus that moves an image pickup device which is image pickup means according to camera shake, and further applies a buffering structure for protecting the lens barrel from a shock such as a drop.

The bent optical system is a photographing optical system configured to bend a luminous flux of an object incident, along a first optical axis (hereinafter referred to as "optical axis O1") toward a second optical axis (hereinafter referred to as "optical axis O2") which is an optical axis of the photographing optical system orthogonal to the optical axis O1 and form an optical image on a light-receiving plane of the image pickup device disposed on the optical axis O2.

In the following explanation, suppose the object side of the digital camera 1 in the optical axis O1 direction is the forward side. Furthermore, the direction parallel to the optical axis O2 is a Z direction. Suppose the direction along the plane orthogonal to the optical axis O2 and parallel to the direction of the optical axis O1 is a Y direction, which is a second direction, and the direction orthogonal to the Y direction is an X direction, which is a first direction. The right and left in the X direction are indicated by the right and left as viewed from the hack unless specified otherwise.

The digital camera 1 of the present embodiment has a box-shaped external body as shown in FIGS. 1 to 4 and is made up of a front cover 2 and a rear cover 3 facing each other and coupled together, a lens barrel unit 20 accommodated in the front cover 2 and the rear cover 3, and a camera control substrate 18.

A photographing opening window section 2d and a light-emitting window 2e of a strobe light-emitting apparatus or the like are disposed on the front surface section of the front cover 2 and a power switch button 15 and a release button 14 are disposed on the top surface section.

An operation switch button group 13 for setting a photographing mode or the like and an LCD monitor 16 are disposed on the rear of the rear cover 3.

The camera control substrate 18 is made up of a printed circuit in which a CPU that performs overall control of the camera, a photographing mode control section, a strobe light emission control section, an image processing section that processes image data photographed by the image pickup device, a recording control section that writes photographed image data into a memory card, which is an image recording medium, inserted in the camera and a camera shake detecting sensor or the like are mounted, and is incorporated on the right side in the front cover 2.

The lens barrel unit 20 is provided with a lens barrel body 4 as a flat-shaped lens barrel, a bent optical system which is a photographing optical system incorporated in the lens barrel body 4 for performing photographing, an image pickup unit 88 which is a movable unit incorporating a CCD 96 which is the image pickup device and a CCD drive mechanism section 71 as a camera shake correcting apparatus disposed at the bottom of the lens barrel body 4 in the Z direction. Suppose the outer surface on the front side of the lens barrel unit 20 is referred to as a "first outer surface," Furthermore, suppose the outer surface on the right side of the lens barrel unit 20 is referred to as a "second outer surface."

Figure 6:
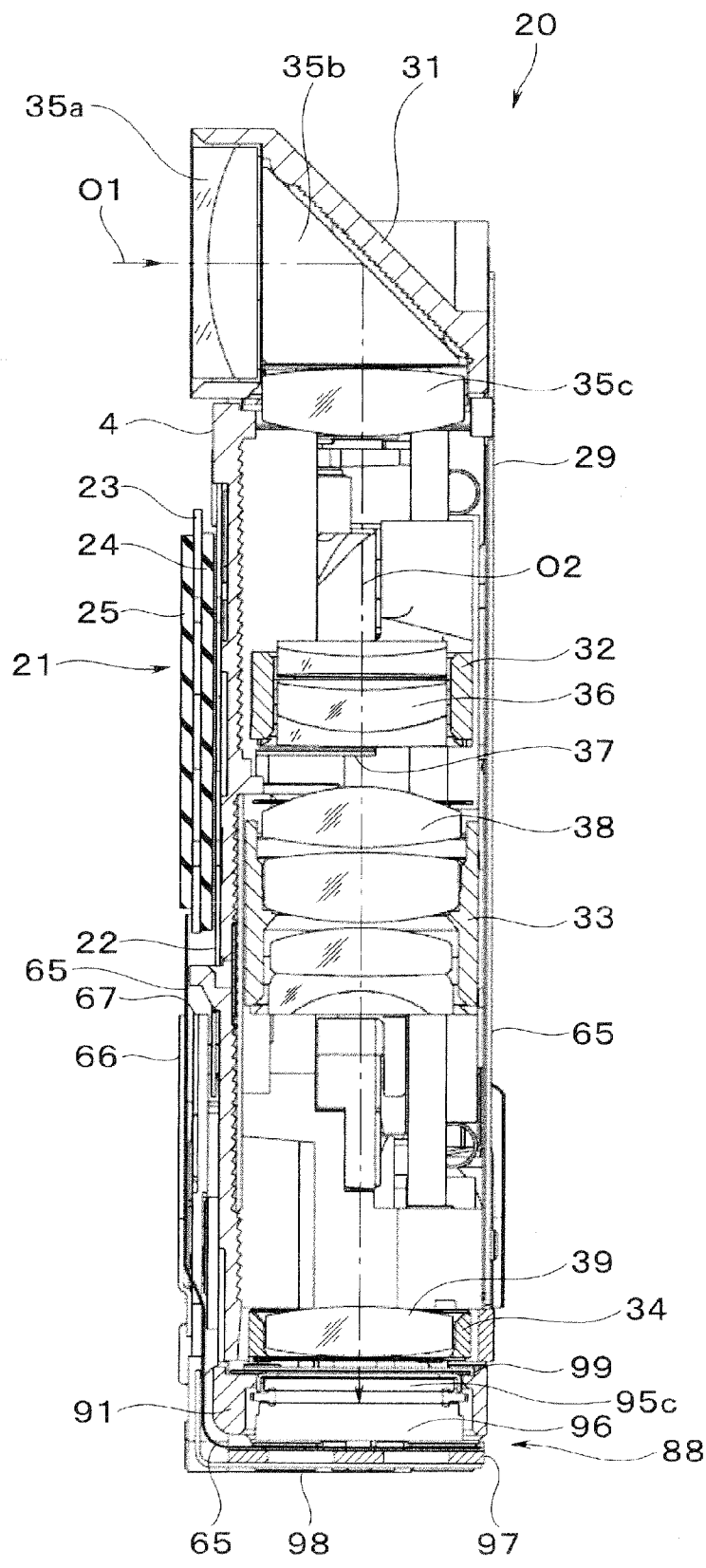
FIG. 6 is a VI-VI cross-sectional view in FIG. 5 (cross-sectional view along the optical axis of the lens barrel unit in FIG. 5)

The bent optical system incorporated in the lens barrel body 4 is made up of a first group lens (front) 35a disposed on the optical axis O1 as a first group lens system, a prism 35b that refracts an object luminous flux toward the optical axis O2, further a first group lens (back) 35c disposed below the prism 35b, a second group lens 36 and a third group lens 38 disposed along the optical axis O2 and constituting a zoom lens, a shutter/diaphragm 37 disposed between the second group lens 36 and the third group lens 38 and a fourth group lens 39 constituting a focus lens (FIG. 6).

As lens frame members for holding the above described lens groups, a first group frame 31 for holding the first group lenses 35a and 35c and the prism 35b is disposed on the optical axis O1, and a second group frame 32 for holding the second group lens 36, a third group frame 33 for holding the third group lens 38 and a fourth group frame 34 for holding the fourth group lens 39 are disposed on the optical axis O2. Furthermore, the shutter/diaphragm 37 is supported in a manner openable/closable at a diaphragm opening section of the lens barrel body 4 (FIG. 6).

Figure 4:
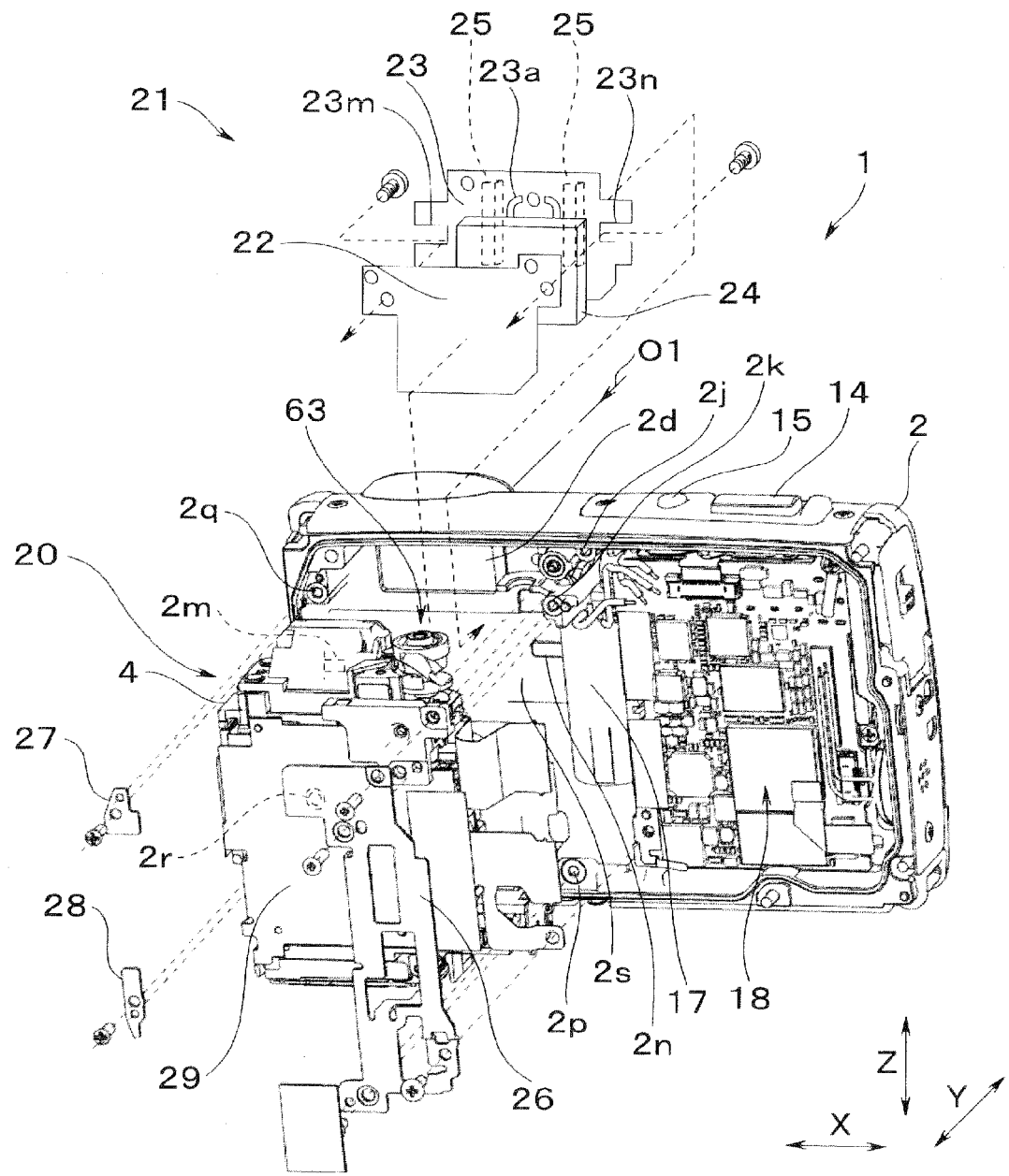
FIG. 4 is a perspective view of the digital camera in FIG. 3 showing a state in which the front cover, lens barrel unit and buffering unit are broken down.
Figure 5:
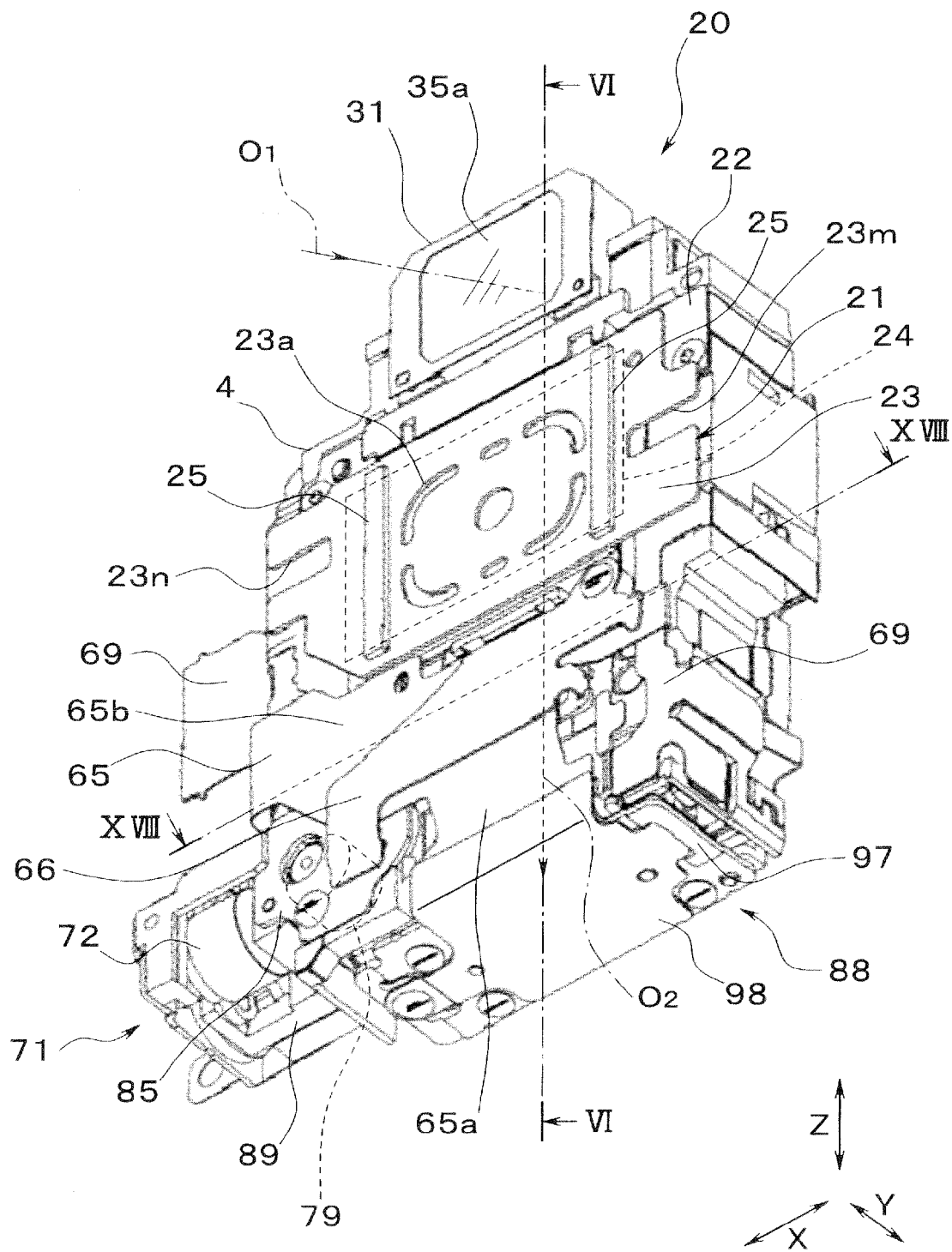
FIG. 5 is a perspective view of the lens barrel unit in FIG. 4 as viewed from the front bottom.

The lens barrel unit 20 in which the bent optical system is incorporated is accommodated in a housing section 2s of the front cover 2 via a buffering unit 21 on the front side of the lens barrel body 4 (FIGS. 4 and 5).

The buffering unit 21 is made up of thin plate members 22 and 23, a shock absorption member 24 made of a rubber member or the like adhered and sandwiched between the thin plate members 22 and 23 and an elastic sheet 25 made of sponge or the like, adhered and fixed to the front of the thin plate member 23.

The thin plate member 22 is fixed to the front of the lens barrel body 4. When the lens barrel body 4 is accommodated in the housing section 2s of the front cover 2, the thin plate member 23 comes into contact with the housing surface with the elastic sheet 25 compressed, and is thereby positioned and fixed.

In the event that the digital camera 1 in which the lens barrel unit 20 is accommodated receives an impact force in the optical axis O2 direction in particular, the impact force is absorbed by shear elastic deformation of the shock absorption member 24 of the buffering unit 21 and the components incorporated in the lens barrel unit 20, the second, the third and the fourth group frames 32, 33 and 34 in particular are protected.

Furthermore, applying the elastic sheet 25 eliminates a backlash with respect to the front cover 2 of the lens barrel body 4 and allows a more correct camera shake correcting operation to be performed.

Here, details of the lens frame section incorporated in the lens barrel body 4 of the lens barrel unit 20 for holding the bent optical system will be explained using FIGS. 7 to 9.

Figure 7:
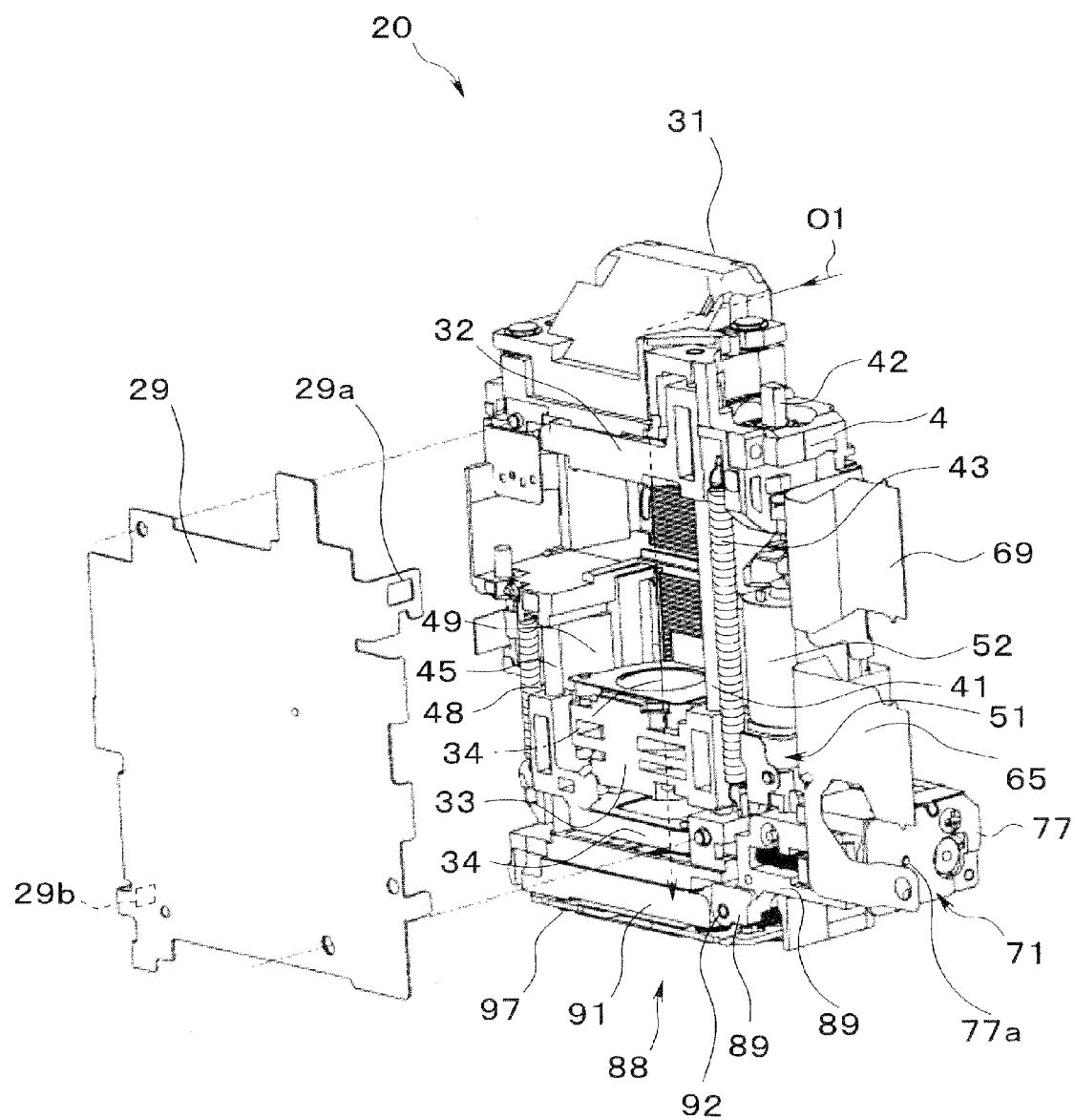
FIG. 7 is a perspective view of the lens barrel unit in FIG. 4 as viewed from the back illustrating a state with a rear cover plate removed.

FIG. 7 is a perspective view of the lens barrel unit in FIG. 4 as viewed from the back and illustrates the lens barrel unit with the rear cover plate removed. FIG. 8 is an exploded perspective view of the lens barrel unit in FIG. 7 and illustrates a state in which the peripheries of the second and third group frames are broken down. FIG. 9 is an exploded perspective view of the lens barrel unit in FIG. 7 and illustrates a state in which the periphery of the fourth group frame is broken down.

A rear cover plate 29 is attached to the back of the lens barrel body 4 to shield the interior of the lens barrel body 4 as shown in FIG. 7. The rear cover plate 29 is fixed to the lens barrel body 4 by causing engagement holes 29a and 29h to engage with engagement protrusions of the lens barrel body 4.

The first group frame 31 is fixed to the top of the lens barrel body 4 via a screw as shown in FIG. 7.

Figure 8:
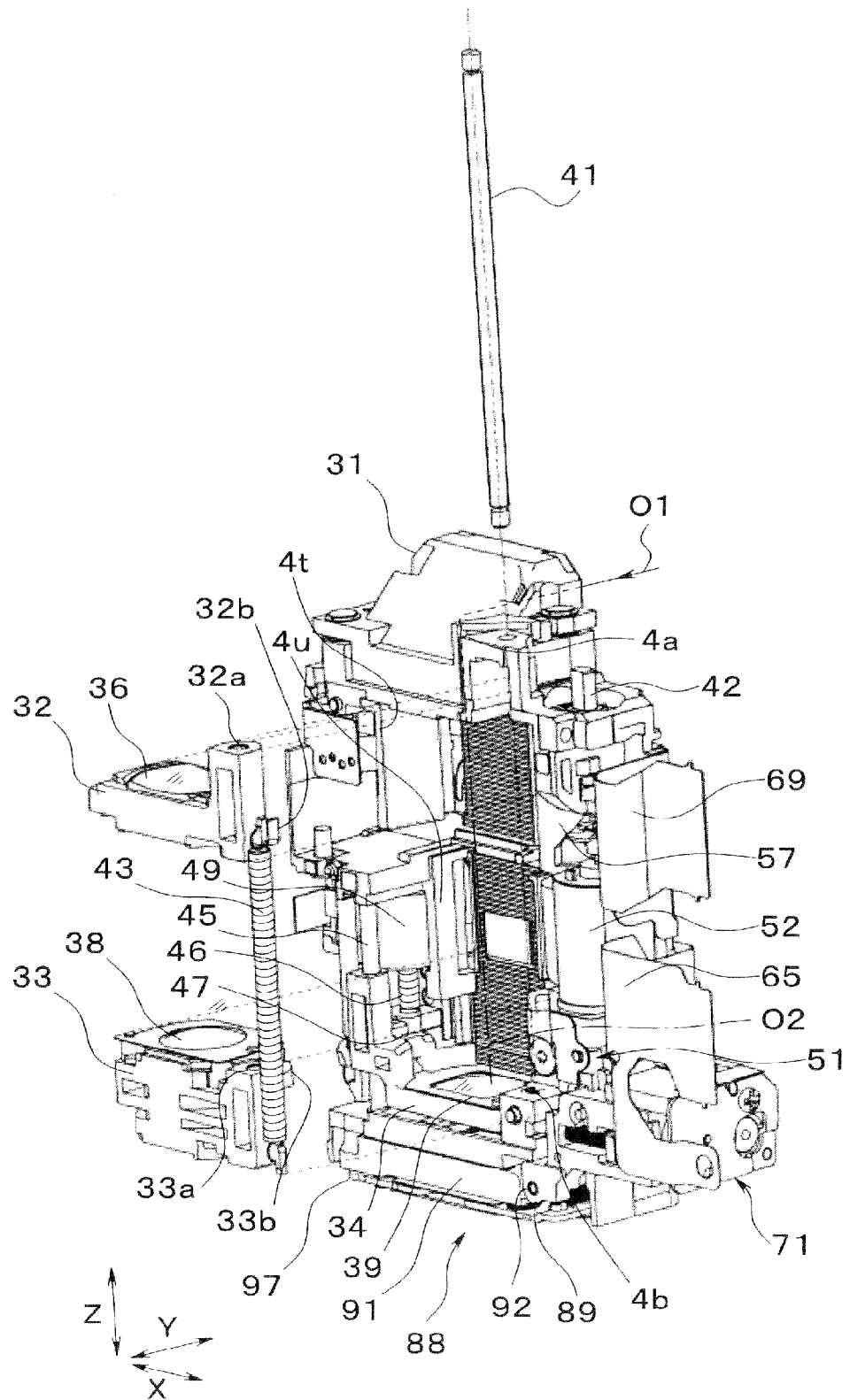
FIG. 8 is an exploded perspective view of the lens barrel unit in FIG. 7 illustrating a state in which the peripheries of the second and third group frames are broken down.

The second group frame 32 and the third group frame 33 are supported to the lens barrel body 4 with their respective bearings 32a and 33a slidably engaged with a guide shaft 41 as shown in FIG. 8. The guide shaft 41 is inserted into shaft holes 4a and 4b on the right of the lens barrel body 4 along the Z direction and fixed. Rotation around the guide shaft of the second group frame 32 is regulated by a Z direction guide section 4t of the lens barrel body 4 and rotation around the guide shaft of the third group frame 33 is regulated by a Z direction guide section 4u of the lens barrel body 4. A tension spring 43 is suspended between the second group frame 32 and the third group frame 33, whereby the second group frame 32 and the third group frame 33 are urged in a direction they approach each other.

Furthermore, follower lugs 32b and 33b provided so as to protrude in the vicinity of the respective shaft holes of the second group frame 32 and the third group frame 33 engage with and contact a zoom cam 57.

The zoom cam 57 is disposed on the right of the lens barrel body 4 along the Z direction and is driven to rotate by a zoom motor 52 made up of a DC motor via a zoom drive mechanism section 51.

When the zoom motor 52 is driven to rotate during a zoom drive operation, the zoom cam 57 rotates and drives the second group frame 32 and the third group frame 33 to move forward or backward along the optical axis O2 to their respective zooming positions.

A cam support shaft 42 is connected to the zoom cam 57 and a gear array (not shown) and is driven to rotate as the zoom cam 57 rotates. A barrier drive mechanism section 63 (FIG. 4) to drive a barrier (not shown) that opens or closes the front side of the first group lens 35a engages with the top end of the cam support shaft 42.

The shutter/diaphragm 37 is located between the second group frame 32 and the third group frame 33 as described above and is driven to open or close by a shutter/diaphragm drive actuator (not shown) disposed at the top left of the lens barrel body.

Figure 9:
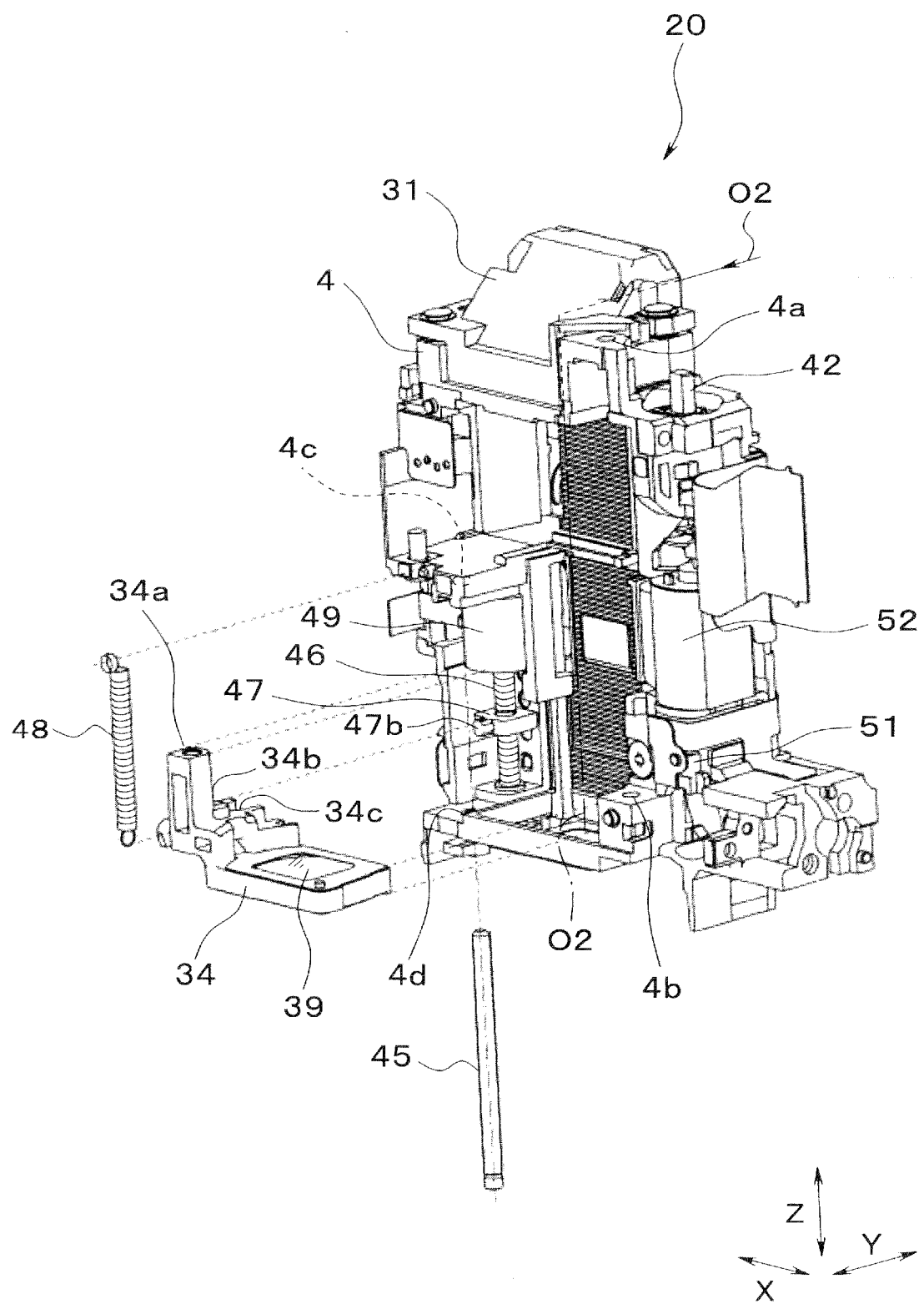
FIG. 9 is an exploded perspective view of the lens barrel unit in FIG. 7 illustrating a state in which the periphery of the fourth group frame is broken down.

The fourth group frame 34 is supported with a guide shaft 45 slidably inserted in a bearing 34a as shown in FIG. 9. The guide shaft 45 is inserted into shaft holes 4c and 4d on the left of the lens barrel body 4 along the Z direction and fixed. A tension spring 48 is suspended at the fourth group frame 34, which is urged upward in the Z direction and supported.

Furthermore, a focus motor 49 made up of a stepping motor is disposed in the vicinity of the guide shaft 45 and a feed screw shaft 46 along the Z direction is fixed to the output shaft of the focus motor 49. The feed screw shaft 46 is fitted with a nut 47 and therefore the nut 47 is movably supported in the Z direction. The nut 47 contacts the top surface of a U-shaped section 34c of the fourth group frame 34 which spans over the feed screw shaft 46, thereby regulating the movement in the Z direction of the fourth group frame 34 against the urging force of the tension spring 48. A protrusion 47b of the nut 47 engages with a notch section 34b of the fourth group frame 34, and therefore the rotation of the nut 47 is regulated.

Therefore, when the focus motor 49 is driven to rotate during a focusing drive, the fourth group frame 34 is driven to move forward or backward along the optical axis O2 as the feed screw shaft 46 rotates and moves to a focusing position.

The fourth group frame 34 is driven toward the image pickup unit 88 downward in the optical axis O2 direction when the power is turned OFF and moves to a position extremely close to the opening section of the CCD frame 91 of the image pickup unit 88. As the power is turned ON, the fourth group frame 34 is driven upward and moves to a focus position apart from the image pickup unit 88.

Next, a detailed configuration of the units (image pickup unit and CCD drive mechanism section) making up the camera shake correcting apparatus mounted at a lower position of the lens barrel unit 20 will be explained using FIGS. 10 to 16.

Figure 10:
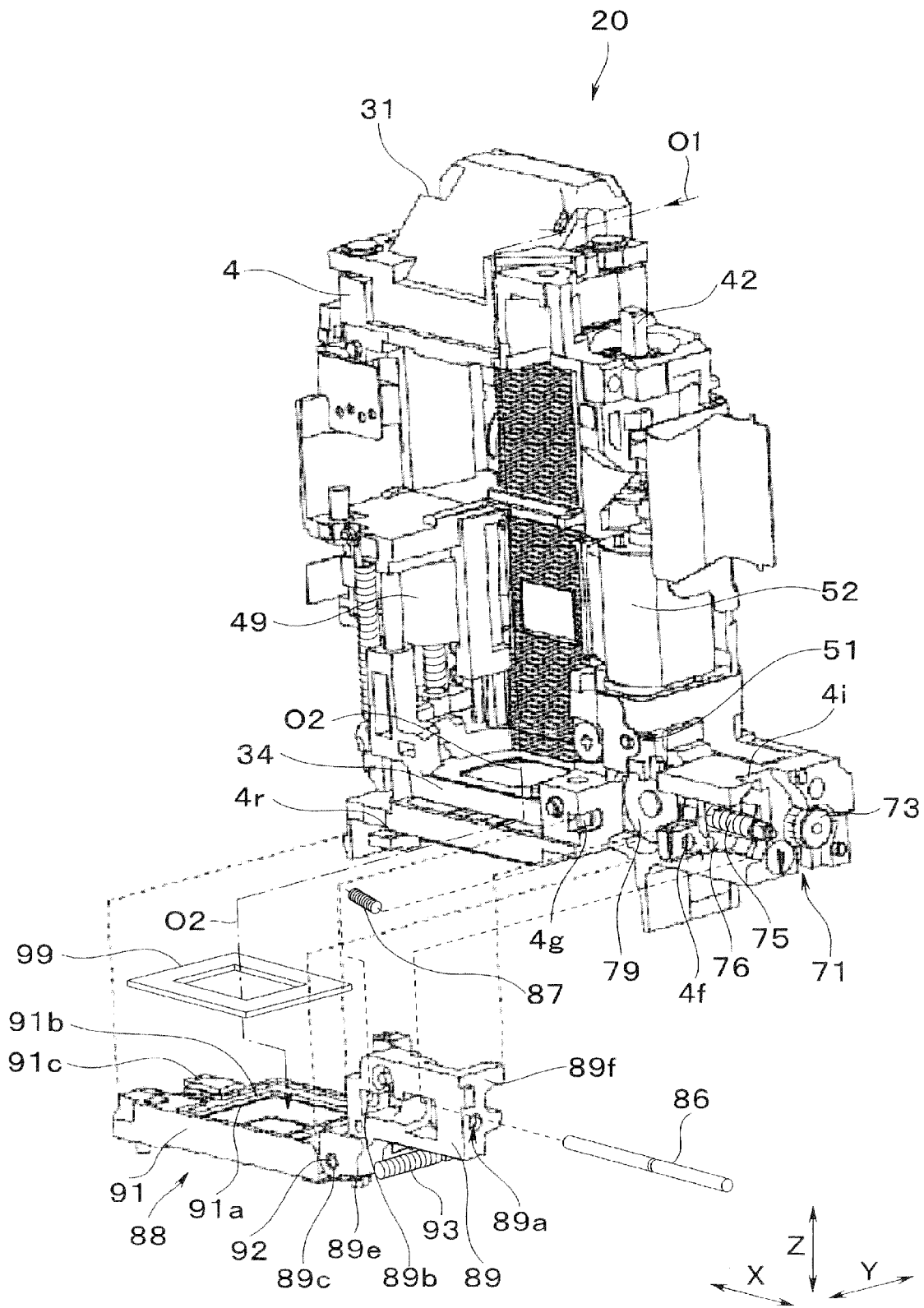
FIG. 10 is a diagram illustrating a state in which the peripheries of the image pickup unit and the CCD frame drive section are broken down out of the exploded perspective view of the lens barrel unit in FIG. 7.
Figure 11:
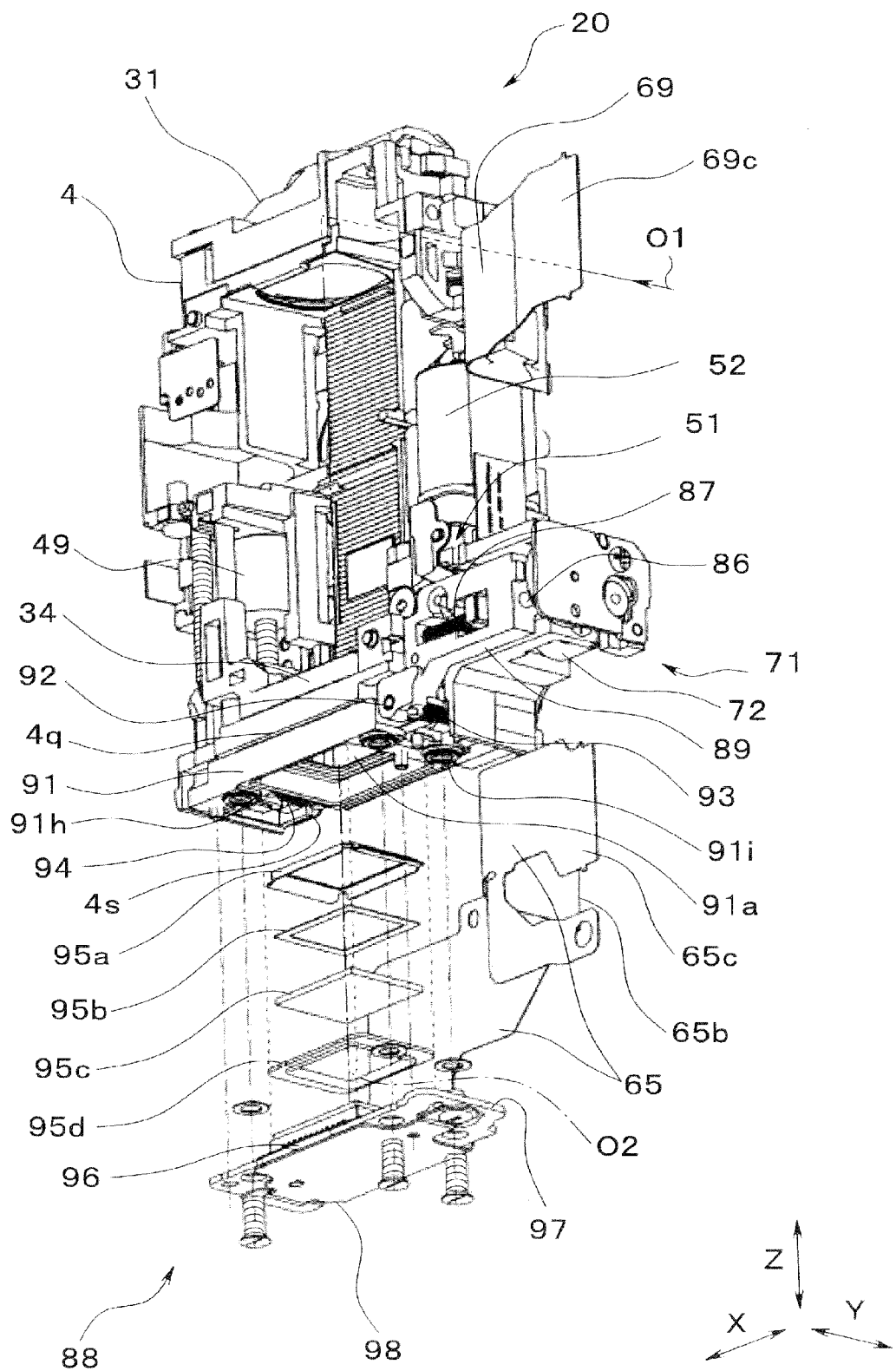
FIG. 11 is a diagram illustrating a state in which the periphery of the image pickup device of the image pickup unit is broken down out of the exploded perspective view of the lens barrel unit in FIG. 7.
Figure 12:
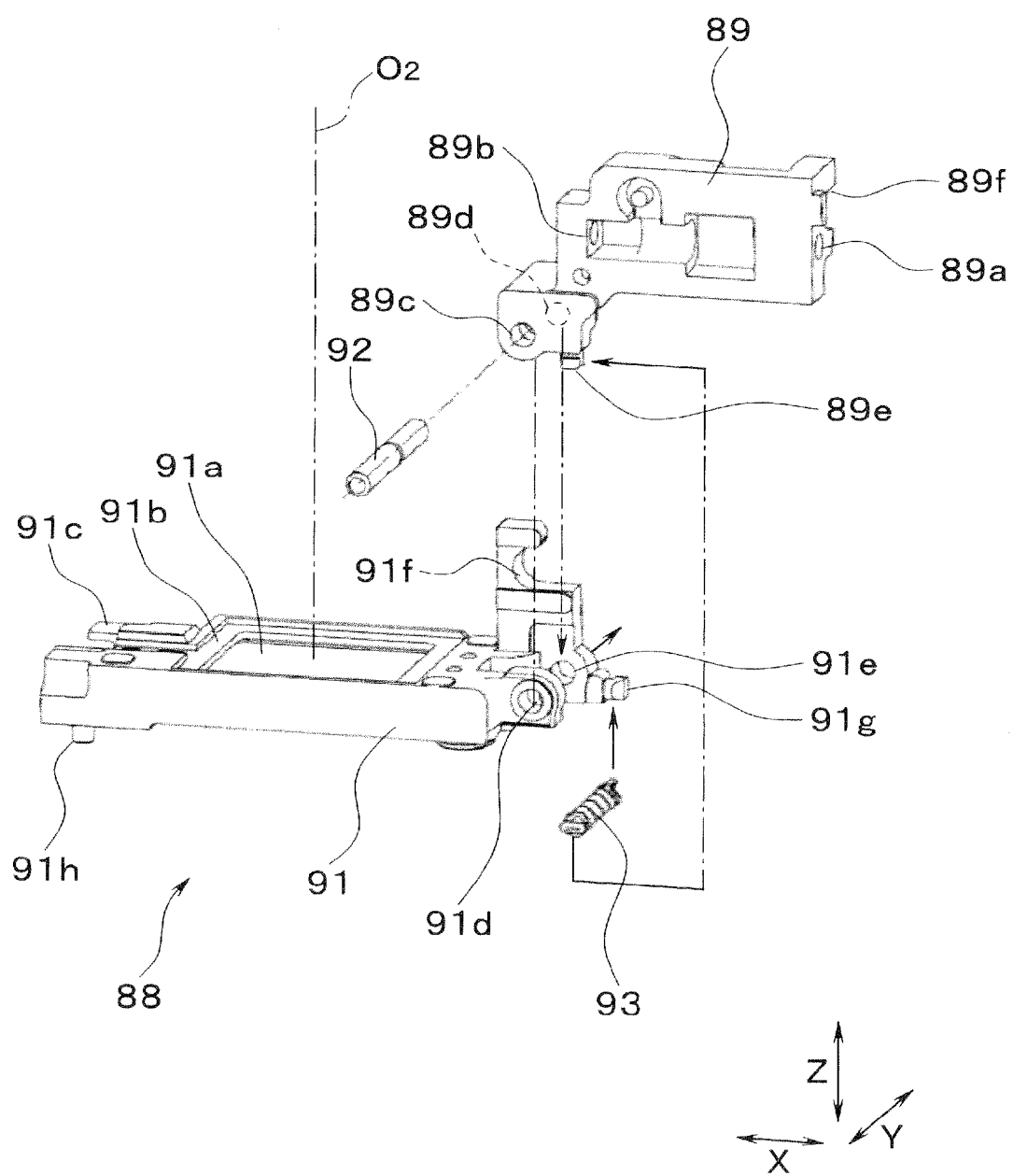
FIG. 12 is an exploded perspective view of the image pickup unit in FIG. 10 as viewed from the back.
Figure 13:
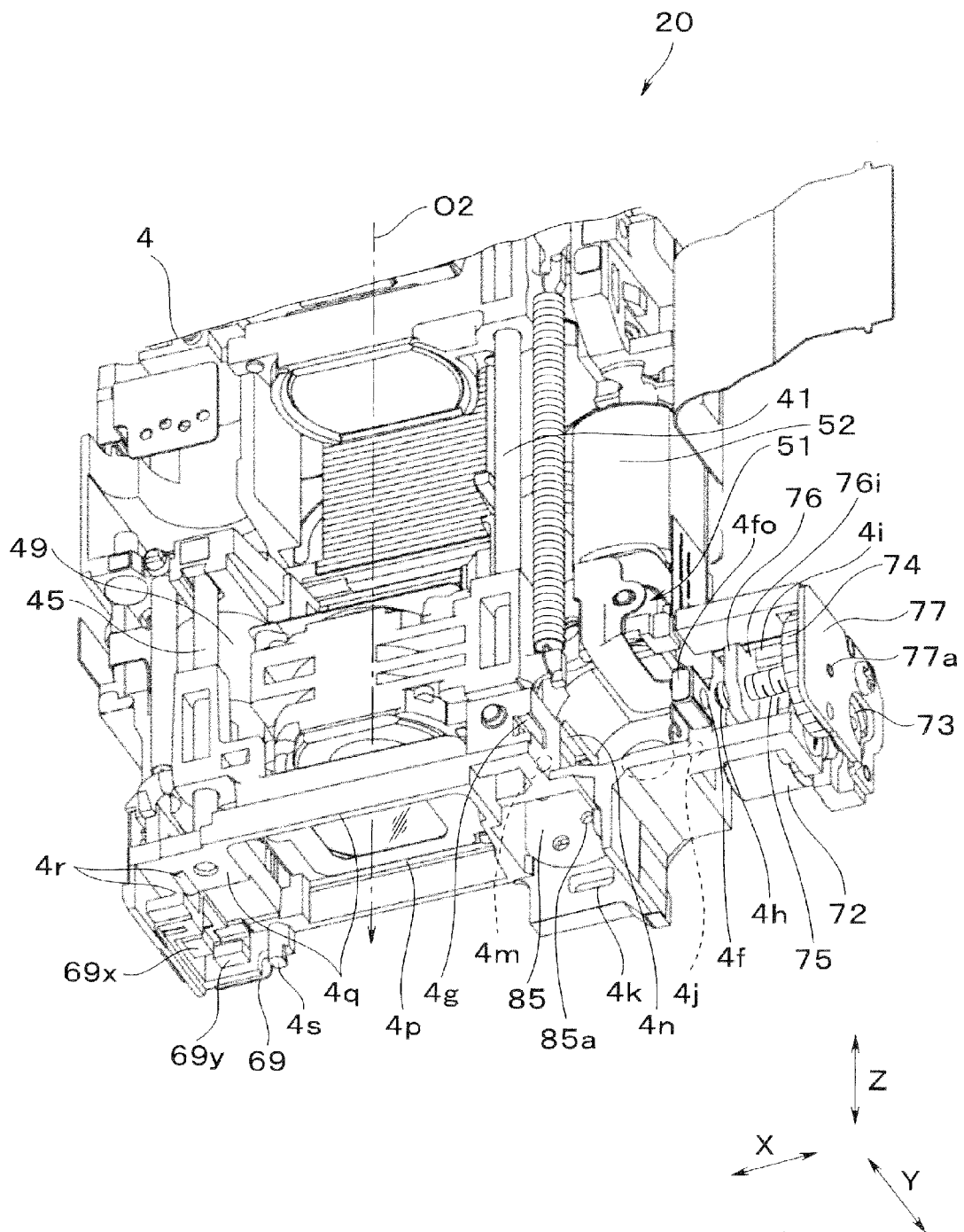
FIG. 13 is an exploded perspective view illustrating details of the image pickup unit and the mounting section of the CCD frame drive section in the lens barrel body of the lens barrel unit in FIG. 7.
Figure 14:
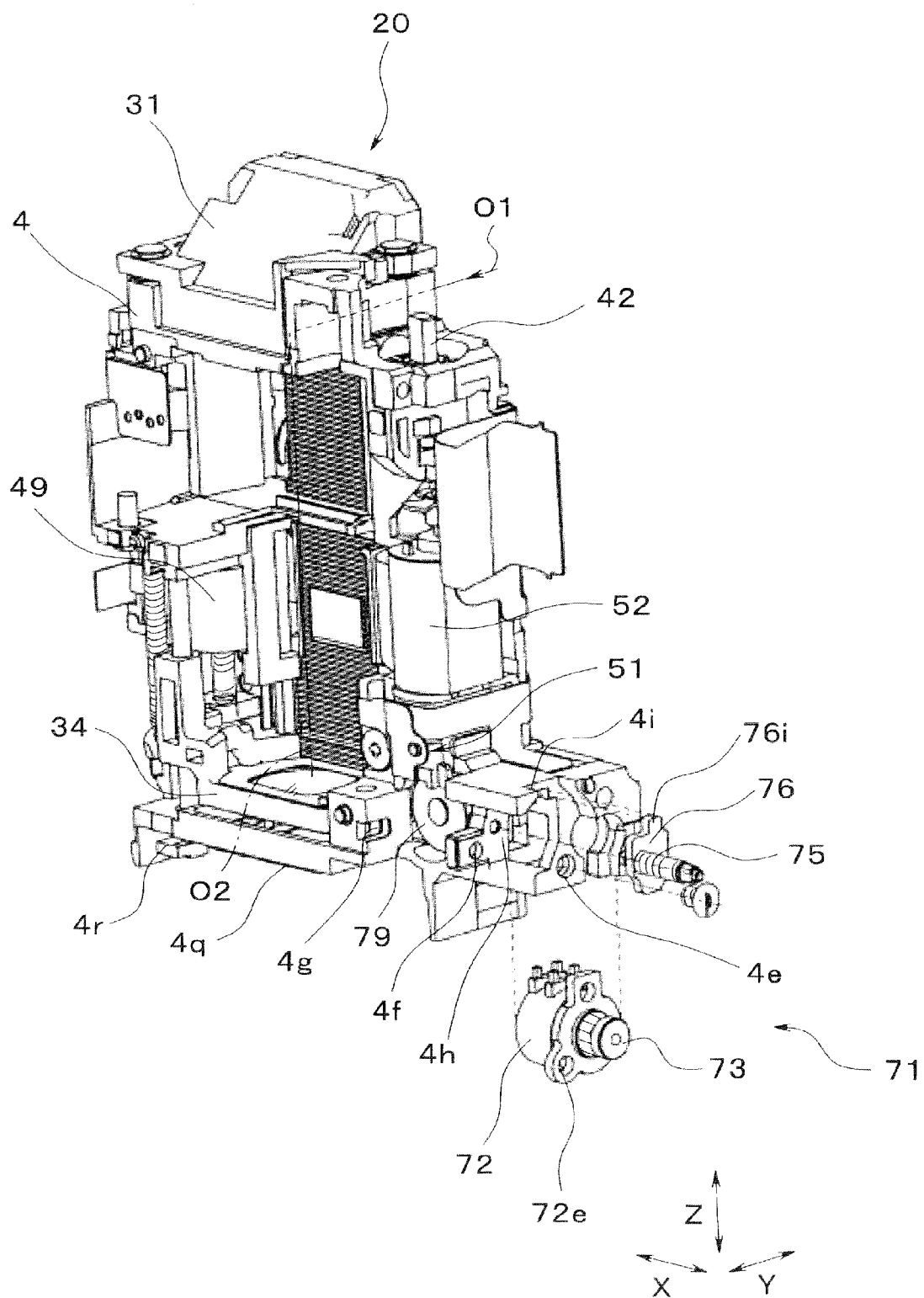
FIG. 14 is a diagram illustrating a state in which the periphery of the X drive motor of the CCD frame drive section is broken down out of the exploded perspective view of the lens barrel unit in FIG. 7.
Figure 15:
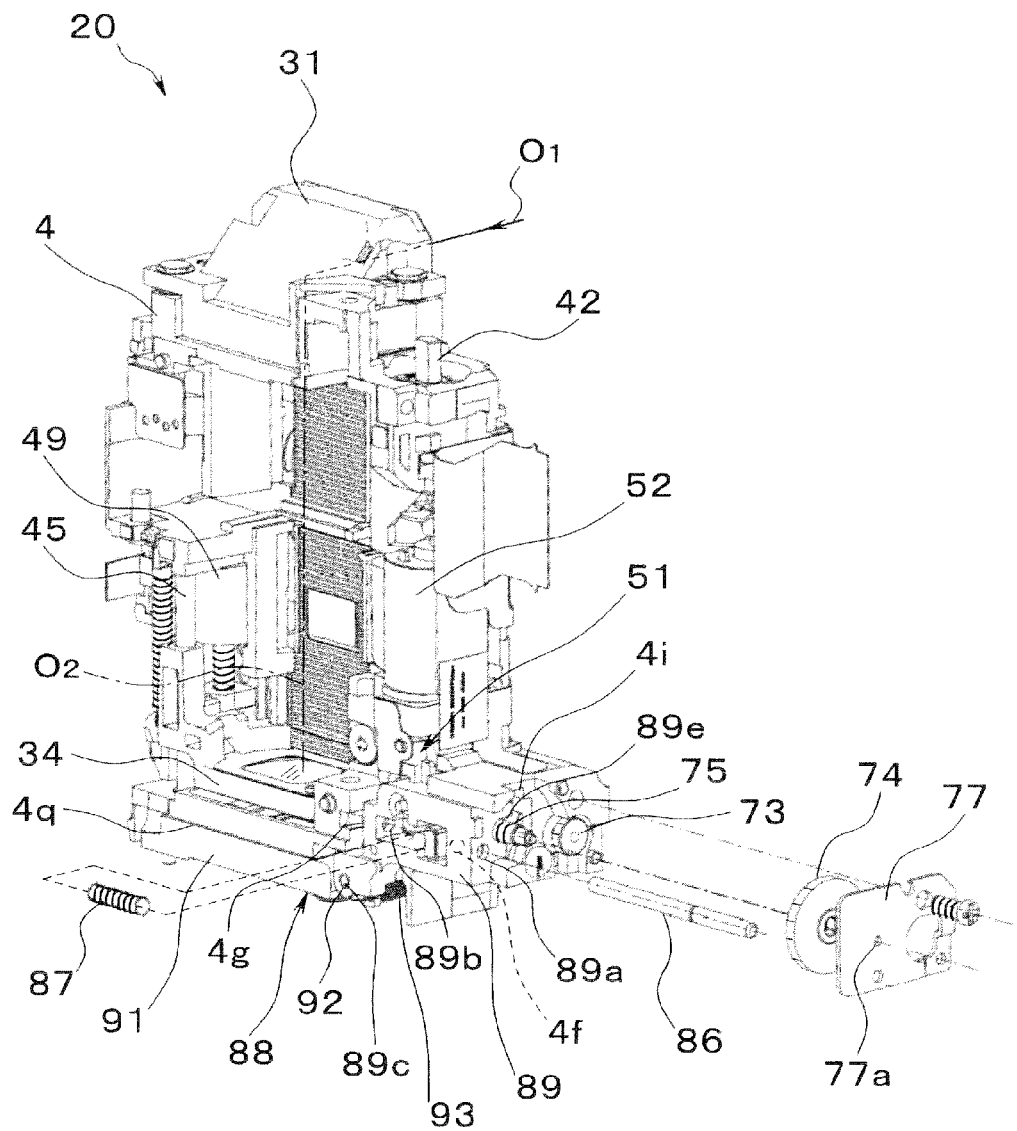
FIG. 15 is a diagram illustrating a state in which the periphery of the CCD frame drive section for X is broken down out of the exploded perspective view of the lens barrel unit in FIG. 7.
Figure 16:
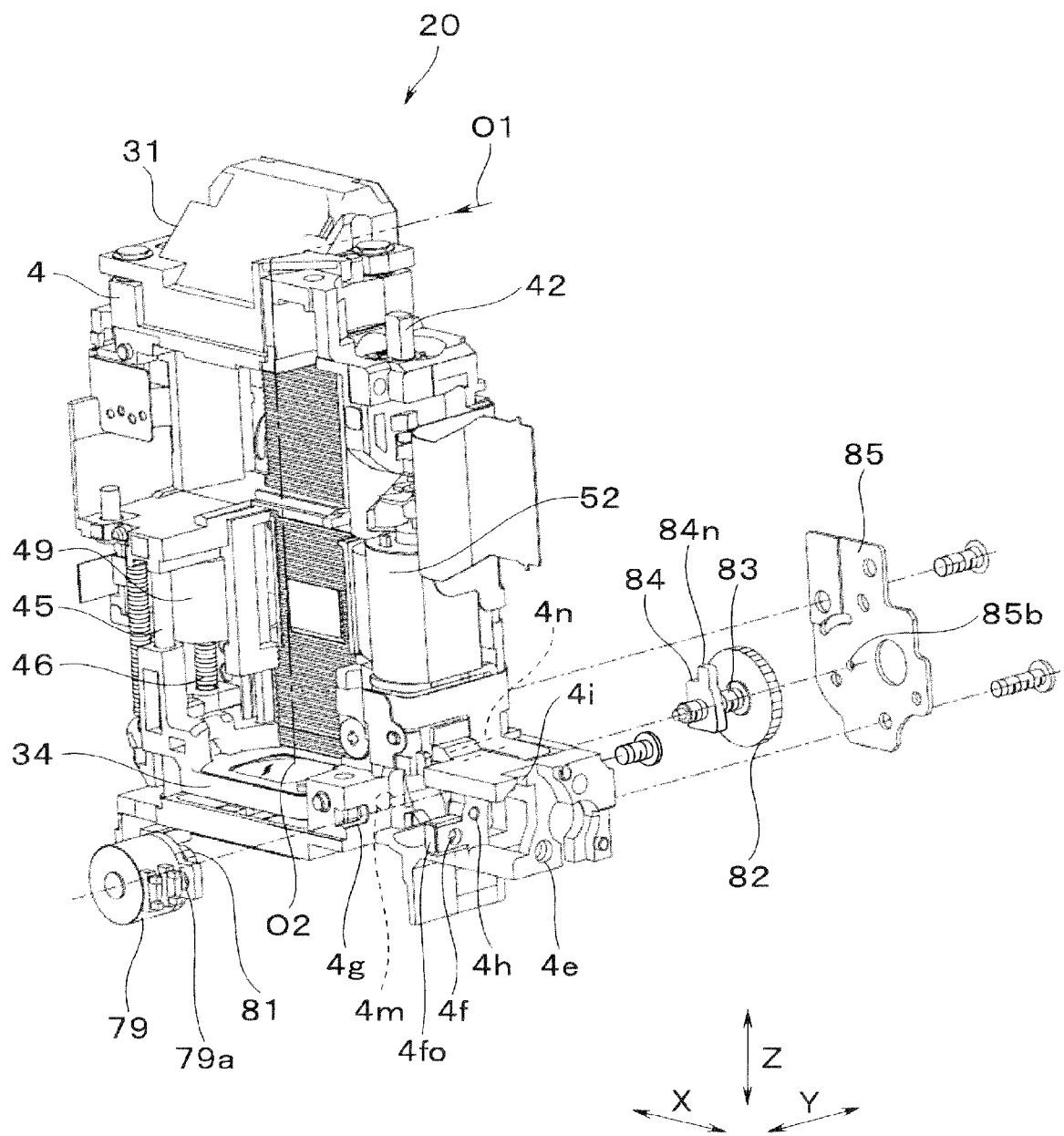
FIG. 16 is a diagram illustrating a state in which the peripheries of the CCD frame drive section for Y and the Y drive motor are broken down out of the exploded perspective view of the lens barrel unit in FIG. 7.

FIG. 10 is an exploded perspective view of the lens barrel unit in FIG. 7 and illustrates a state in which the peripheries of the image pickup unit and the CCD frame drive section are broken down. FIG. 11 is an exploded perspective view of the lens barrel unit in FIG. 7 and illustrates a state in which the periphery of the image pickup device of the image pickup unit is broken down. FIG. 12 is an exploded perspective view of the image pickup unit in FIG. 10 as viewed from the back. FIG. 13 is a perspective view illustrating details of the image pickup unit and a mounting section of the CCD frame drive section in the lens barrel body of the lens barrel unit in FIG. 7. FIG. 14 illustrates a state in which the periphery of the X drive motor of the CCD frame drive section is broken down out of the exploded perspective view of the lens barrel unit in FIG. 7. FIG. 15 illustrates a state in which the periphery of the CCD frame drive section (for X) is broken down out of the exploded perspective view of the lens barrel unit in FIG. 7. FIG. 16 illustrates a state in which the peripheries of the CCD frame drive section (for Y) and the Y drive motor are broken down out of the exploded perspective view of the lens barrel unit in FIG. 7.

The camera shake correcting apparatus is made up of a movable unit (image pickup unit 88) mounted with an image pickup device (CCD 96) and a CCD frame drive section 71 to drive the movable unit (image pickup unit 88) to be displaced. The camera shake correcting apparatus is disposed at the bottom of the lens barrel body 4 and under the bent optical system.

As shown in FIGS. 10 and 11, the image pickup unit 88 is made up of an X slider 89 which is a first movable member capable of being displaced with respect to the lens barrel body 4 in the X direction via an X guide shaft 86 which is first guide means and a first shaft member, a CCD frame 91 which is a second movable member capable of also being displaced with respect to the X slider 89 relatively in the Y direction, and is connected via a Y guide shaft 92 which is second guide means and a second shaft member, a CCD support plate 97 fixed to the bottom of the CCD frame 91, a presser plate 95a, a diaphragm plate 95b, an optical LPF 95c and a rubber frame 95d held to the CCD support plate 97, the CCD 96 which is an image pickup device, a CCD connection FPC 65 in which the CCD 96 is mounted and a flexible presser plate 98.

Furthermore, the CCD frame drive section 71 to drive the X slider 89 of the image pickup unit 88 and the CCD frame 91 is disposed at the right bottom of the lens barrel body 4 as shown in FIGS. 10 and 11 and made up of an X drive mechanism section including an X drive motor 72, a gear section and a feed screw, and a Y drive mechanism section made up of a Y drive motor 79, a gear section and a feed screw.

The CCD frame 91 has a central opening section 91a on the optical axis O2, is a frame member with the diaphragm plate 95b, the optical LPF 95c and the CCD 96 mounted on the central opening section 91a and is attached in a manner slidably displaceable along a bottom surface 4q of the lens barrel body 4 on the XY plane. Furthermore, a rectangular frame-like adhesive tape 99 is pasted to the top surface section of a recess section 91b surrounding the central opening section 91a of the CCD frame 91 (FIG. 10).

The top surface of the adhesive tape 99 has an adhesive property when pasted to the CCD frame and is an adhesive member to capture dust generated inside the lens barrel body 4 before dust is stuck to the top surface of the optical LPF 95c which is on the light-receiving plane 96a side of the CCD 96.

The CCD 96 mounted on the CCD connection FPC 65 is disposed in the center of the top surface of the CCD support plate 97 on the optical axis O2, and after further superimposing the rubber frame 95d, the optical LPF 95c, the diaphragm plate 95b and the presser plate 95a thereon from the image pickup surface of the CCD 96 upward, the CCD 96 is inserted in an opening section 91a of the CCD frame 91. When inserted in the CCD frame, the CCD support plate 97 is fixed to the bottom surface of the CCD frame 91 by fitting a screw into a screw hole 91i.

The CCD frame 91 and the X slider 89 of the image pickup unit 88 are coupled via a Y guide shaft 92 as shown in FIG. 12 in a manner relatively movable in the Y direction. Furthermore, as described above, the X slider 89 is supported to the lens barrel body 4 slidably in the X direction via the X guide shaft 86. Therefore, the CCD frame 91 is supported to the lens barrel body 4 in a manner two-dimensionally displaceable on the XY plane. Here, when the CCD frame 91 shift-moves with respect to the lens barrel body 4 two-dimensionally on the XY plane, each amount of movement of the CCD frame 91 in the X direction or Y direction is set to be greater than a maximum amount of camera shake corrected in each moving direction.

Explaining in further detail, the X slider 89 is provided with a pair of shaft holes 89a and 89b that penetrate in the X direction, a pair of shaft holes 89c and 89d that penetrate in the Y direction at upper positions close to the shaft holes 89a and 89b, and provided with a spring suspension protrusion 89e below the shaft hole 89c and provided with a U-shaped notch section 89f on the side of the shaft hole 89a (FIG. 12).

The CCD frame 91 is provided with a pair of shaft holes 91d and 91e that penetrate in the Y direction at a right end of the central opening section 91a, a spring suspension protrusion 91g and a U-shaped notch section 91f at an upper position of the shaft hole 91e. Furthermore, a guide protrusion 91c and a spring suspension protrusion 91h are provided at a left end of the central opening section 91a.

When the CCD frame 91 is coupled with the X slider 89, the Y guide shaft 92 is inserted from the shaft hole 89c of the X slider 89 first, made to penetrate, then alternately penetrate the shaft hole 91d, the shaft hole 89d and the shaft hole 91e of the CCD frame 91 and X slider 89 and adhered and fixed to the shaft holes 89c and 89d. When the Y guide shaft 92 is fixed, a distal end portion of the Y guide shaft 92 protrudes forward out of the front end face of the CCD frame 91.

Furthermore, a tension spring 93, which is a first elastic member, is suspended between the protrusion 91g of the CCD frame 91 and the protrusion 89e of the X slider 89. Therefore, the CCD frame 91 is supported to the X slider 89 in a manner relatively movable in the Y direction urged backward in the Y direction.

The lens barrel body 4 is provided with a shaft hole 4f in a protrusion 4/0 that protrudes backward at the right bottom and a shaft hole 4g on the side of the protrusion 4/0 close to the optical axis O2, and the shaft holes 4f and 4g are located along the X direction (FIG. 13). Furthermore, a long hole 4k along the X direction is provided in a wall section of the lens barrel body 4 at a position apart from lower positions of the shaft holes 4f and 4g forward in the Y direction. The shaft hole 4g on the side close to the optical axis O2 is not a round hole, but formed of two sets of mutually facing parallel protrusions and has a shape ensuring that the X guide shaft 86 is press-fitted, and adhered and fixed.

Furthermore, a guide groove 4r which is third guide means and a spring suspension protrusion 4s are provided on the left of a bottom surface 4q of the lens barrel body 4 and furthermore, an X direction sensor 69x and a Y direction sensor 69y to detect the origin position of the CCD frame 91 (position at which the center of the light-receiving plane of the CCD 96 matches the optical axis O2) are disposed (FIG. 13). The X direction sensor 69x and the Y direction sensor 69y are mounted on the lens barrel control connection FPC 69.

When the X slider 89 coupled with the CCD frame 91 is mounted on the right bottom of the lens barrel body 4, the protrusion 4/0 of the lens barrel body 4 is inserted into a gap between the shaft holes 89a and 89b of the X slider 89 as shown in FIG. 15. The X guide shaft 86 is then inserted from the shaft hole 89a of the X slider 89, made to penetrate the shaft hole 4f of the protrusion 4/0, and then a compression spring 87 is inserted into the X guide shaft 86. Furthermore, the X guide shaft 86 is made to penetrate the shaft hole 89b of the X slider 89, the distal end portion thereof is then press-fitted into the shaft hole 4g of the lens barrel body 4 and adhered and fixed. In this mounting condition, the X slider 89 can slide with respect to the lens barrel body 4 only in the X direction via the X guide shaft 86 and is also urged rightward by the compression spring 87.

On the other hand, the CCD frame 91 coupled with the X slider 89 is mounted by fitting a guide protrusion 91c at the left end into the guide groove 4r of the lens barrel body 4 without any backlash with the CCD frame 91 contacting the bottom surface 4q of the lens barrel body 4 and a tension spring 94, which is a second elastic member, is suspended between a protrusion 91h provided on the bottom surface of the CCD frame 91 and the protrusion 4s provided on the bottom surface of the lens barrel body 4 (FIG. 11). Therefore, the CCD frame 91 receives a clockwise urging force (viewed from above) around the optical axis O2 in a state in which the CCD frame 91 is urged with respect to the X slider 89 backward in the Y direction by the urging force of the tension spring 93 as described above and also by the urging forces of the two tension springs 93 and 94. The urging force removes the backlash of the CCD frame 91 with respect to the Y guide shaft 92.

Furthermore, as described above, the distal end portion of the Y guide shaft 92 in the Y direction that protrudes from the front end face of the CCD frame 91 is made to slidably fit to the long hole 4k of the lens barrel body 4 without any backlash (FIGS. 10 and 11).

In the above described state in which the image pickup unit 88 made up of the CCD frame 91 and the X slider 89 is mounted in the lens barrel body 4, the X slider 89 is guided in the X direction with respect to the lens barrel body 4 by the X guide shaft 86, supported under the leftward urging force by the compression spring, and can be displaced in the X direction with respect to the lens barrel body 4 by pressing the U-shaped notch section 89f by an X feed nut 76 which will be described later. On the other hand, the CCD frame 91 is guided in the Y direction by the Y guide shaft 92 in a state in which the CCD frame 91 can be displaced in the X direction together with the X slider 89 and can also be displaced with respect to the lens barrel body 4 in the Y direction by the U-shaped notch section 91f being pressed via a Y feed nut 84, which will be described later, under a backward urging force by the tension spring 93. As a result, the CCD frame 91 can be displaced with respect to the lens barrel body 4 two-dimensionally on the XY plane orthogonal to the optical axis O2.

In the above described supporting state of the X slider 89, since the distal end portion of the Y guide shaft 92 fit and fixed to the shaft holes 89c and 89d of the X slider 89 is supported by the long hole 4k of the lens barrel body 4, the rotation of the X slider 89 around the X guide shaft 86 is regulated. Moreover, also as for the CCD frame 91, since the Y guide shaft 92 that regulates the rotation of the X slider 89 penetrates the shaft holes 91d and 91e at the right end of the CCD frame 91 and further the protrusion 91c at the left end of the CCD frame 91 is fit to the guide groove 4r of the lens barrel body 4, the CCD frame 91 is supported at three points and supported in a regulated state along the XY plane. Furthermore, since the left side of the CCD frame 91 is urged backward in the Y direction by the tension spring 93 and the right side is urged forward in the Y direction by the tension spring 94, the CCD frame 91 is urged so as to rotate clockwise (when viewed from above) around the optical axis O2 and the engagement backlash with respect to the Y guide shaft 92 is relieved. Therefore, the rotation backlash on the XY plane of the lens barrel body of the CCD frame 91 is eliminated.

The CCD frame drive section 71 that drives the X slider 89 and the CCD frame 91 is made up of the X drive mechanism section and the Y drive mechanism section that drive the image pickup unit 88 to be displaced in the X direction or Y direction as described above.

Motor mounting screw holes 4e and 4j, shaft holes for feed screw shafts 4h and 4m, a nut rotation stopper groove 4i along the X direction and a nut rotation stopper groove 4n along the Y direction are provided at the right bottom of the lens barrel body 4 in which the X and Y drive mechanism sections are incorporated. A gear presser plate 77 provided with a shaft hole for a feed screw shaft 77a is fixed by a screw at the right end face of the lens barrel body 4 and a gear presser plate 85 provided with a shaft hole for a feed screw shaft 85a is fixed by a screw at the right bottom front of the lens barrel body 4 (FIGS. 13 and 14).

The above described X drive mechanism section is made up of an X drive motor 72 with a pinion 73 made up of a stepping motor, an X feed screw shaft 75 in which a gear 74 is fixed to a distal end portion and an X feed nut 76 (FIGS. 14 and 15).

The above described Y drive mechanism section is made up of a Y drive motor 79 with a pinion gear 81 made up of a stepping motor, a Y feed screw shaft 83 in which a gear 82 is fixed to a distal end portion and a Y feed nut 84 (FIG. 16).

In the X drive mechanism section, the X drive motor 72 has its output shaft oriented along the X direction and is mounted on the lens barrel body 4 by fitting a screw into the motor mounting screw hole 4e. The X feed screw shaft 75 is rotatably mounted along the X direction with the gear 74 engaged with the pinion 73 and the nut 76 screwed and engaged with the shaft holes 77a and 4h.

The mounted X feed screw shaft 75 passes through the U-shaped notch section 89f of the X slider 89 and the nut 76 contacts the inner surface of the U-shaped notch section 89f of the X slider 89 urged by the compression spring 87 with a rotation stopper protrusion section 76i of the nut slidably engaged with the nut rotation stopper groove 4i of the lens barrel body 4.

In the Y drive mechanism section, the Y drive motor 79 has its output shaft oriented along the Y direction and is mounted on the lens barrel body 4 by fitting a screw into a motor mounting screw hole 4j. The Y feed screw shaft 83 is rotatably mounted along the Y direction with the gear 82 engaged with the pinion 81 and the nut 84 screwed and engaged with the shaft holes 85b and 4m.

The mounted Y feed screw shaft 83 passes through the U-shaped notch section 91f of the CCD frame 91 and the nut 84 contacts the back surface of the U-shaped notch section 91f of the CCD frame 91 urged by the tension spring 93 with the rotation stopper protrusion 84n of the nut slidably engaged with the nut rotation stopper groove 4n of the lens barrel body 4.

In the lens barrel unit 20 in which the camera shake correcting apparatus made up of the image pickup unit 88 and the CCD frame drive section 71 is incorporated as described above, when the X drive motor 72 is driven to rotate, the X slider 89 is displaced in the X direction and the CCD frame 91 is also integrally displaced in the X direction. Furthermore, when the Y drive motor 79 is driven to rotate, the CCD frame 91 is displaced in the Y direction. As a result, through the rotation drive control of the X drive motor 72 and the Y drive motor 79, the CCD frame 91 is two-dimensionally displaced on the XY plane orthogonal to the optical axis O2, thus making camera shake correction possible.

Here, the bending structure of the CCD connection FPC 65 in the aforementioned lens barrel unit 20 will be explained using FIGS. 17 and 18.

Figure 17:
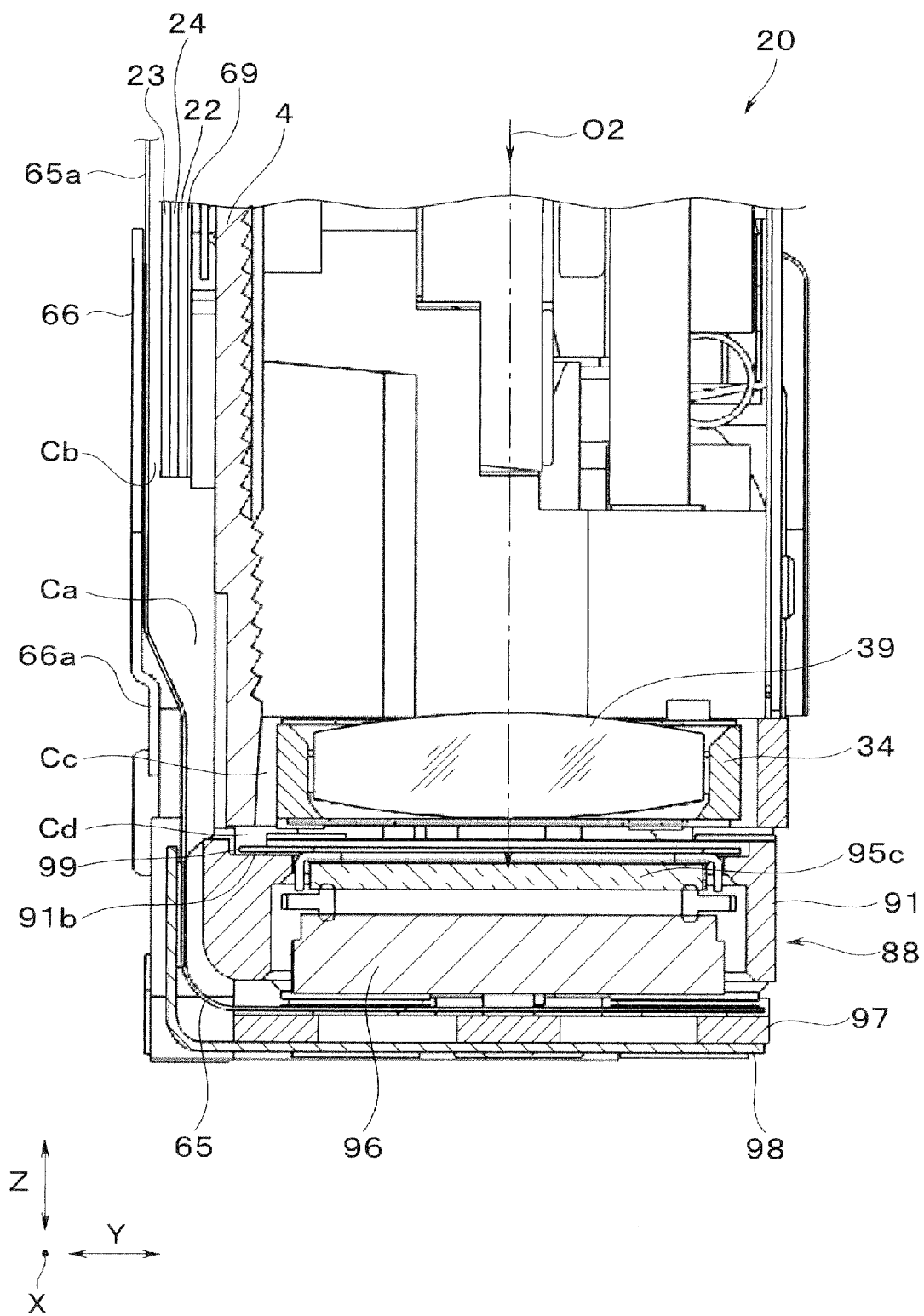
FIG. 17 is a cross-sectional view showing an enlarged view of the periphery of the image pickup device on the bottom side out of the cross-sectional view of the lens barrel unit in FIG. 6.

FIG. 17 is a cross-sectional view showing an enlarged view of the periphery of the image pickup device on the lower part side of the cross-sectional view in FIG. 6. FIG. 18 is an XVIII-XVIII cross-sectional view in FIG. 5 and illustrates a cross section of the periphery of the bent section of the CCD connection FPC diagonally cut at an angle with respect to the optical axis O2. The diagonal direction with respect to the optical axis O2 in this case is indicated by the arrow in FIG. 5.

Figure 18:
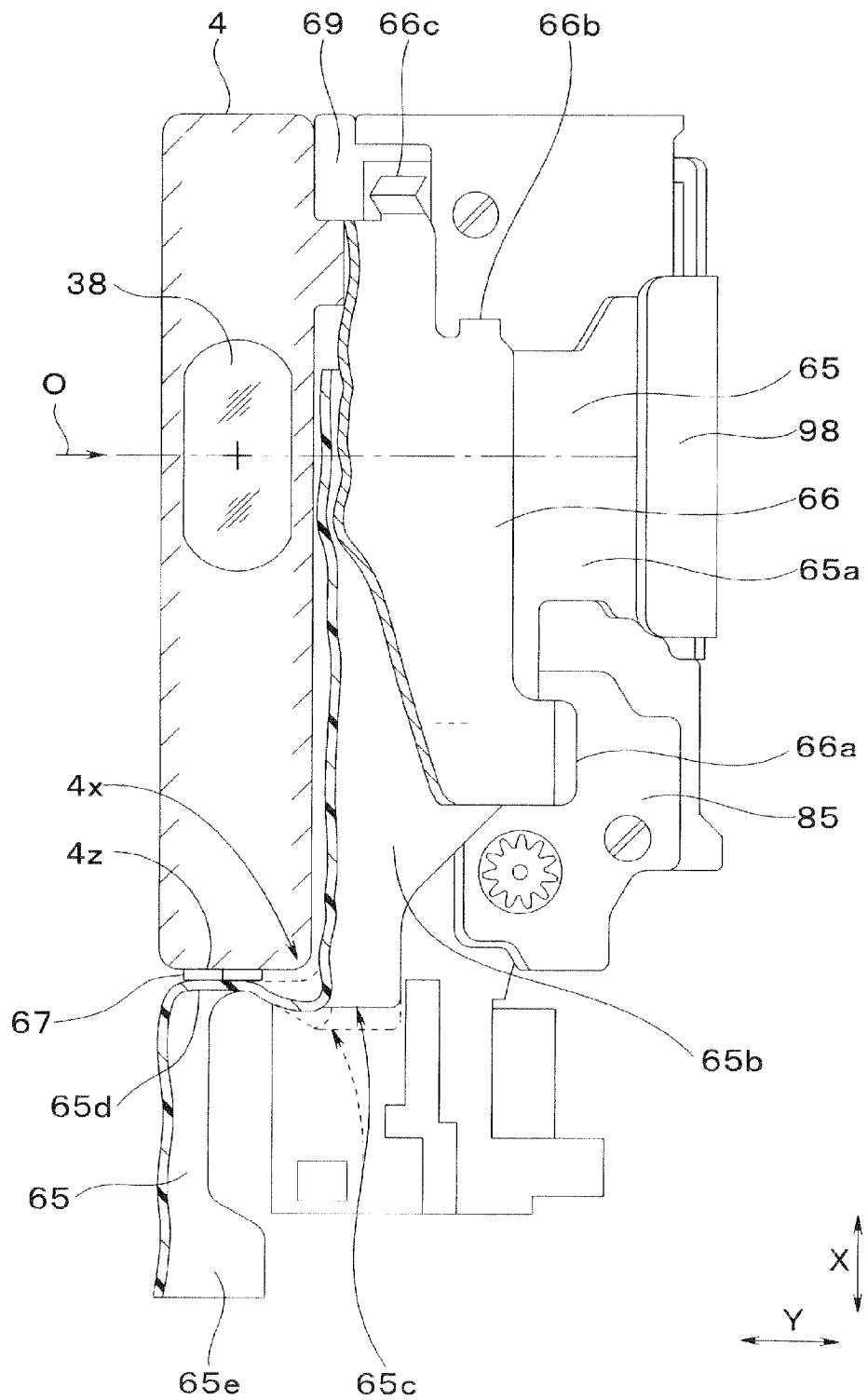
FIG. 18 is an XVIII-XVIII cross-sectional view in FIG. 5 (perspective view illustrating the periphery of the bent section of the CCD connection FPC)

As shown in FIGS. 17 and 18, the CCD connection FPC 65 is guided by the flexible presser plate 98 fixed to the CCD frame 91 at the bottom of the CCD frame 91 making up the image pickup unit 88 and extends as a Z direction extending section 65a which is a first extending section extending upward in the Z direction from the side of the CCD frame 91 along the optical axis O2.

That is, the Z direction extending section 65a extends upward from the bottom in the Z direction, is passed through a gap Ca that exists between an FPC guide plate 66 which is a guide member fixed to the front of the lens barrel body 4 by a screw and the front of the lens barrel body 4, passed through a gap Cb between the FPC guide plate 66 and the front (thin plate member 22 of the buffering unit 21) of the lens barrel body 4 upward in the Z direction, then extends as an X direction extending section 65b (see FIG. 18) which is a second extending section in the X direction orthogonal to the optical axis O2 and is led out toward the left side (downward on the surface of the sheet in FIG. 18) of the lens barrel body 4.

The X direction extending section 65b is bent backward at right angles at a left side ridge 4x of the lens barrel body 4 (lower part on the surface of the sheet in FIG. 18). The right angle bent section 65c is a bent section and a line of intersection by the bending is formed at the corresponding region.

A region away from the right angle bent section 65c by a predetermined distance backward in the bending direction, that is, a tape-adhered section 65d is fixed to a right side region 4z of the lens barrel body 4 (viewed from the back) using double-faced tape 67. After passing through the tape-adhered section 65d, a connector section 65e formed at a distal end portion of the CCD connection FPC 65 is connected to the camera control substrate 18.

The FPC guide plate 66 is provided with protrusions 66a and 66b and a presser protrusion 66c, and fixed to the front of the lens barrel body 4 by a screw. The protrusion 66a contacts the gear presser plate 85 and the protrusion 66b contacts the front of the lens barrel body 4 to secure the gap Cb between the FPC guide plate 66 and the front (buffering unit 21) of the lens barrel body 4. Furthermore, the presser protrusion 66c presses the lens barrel control connection FPC 69.

As described above, the CCD connection FPC 65 led out from the bottom of the CCD frame 91 is bent in the Y direction and the X direction from the Z direction extending section 65a to the tape-adhered section 65d, thus never preventing any two-dimensional displacement on the XY plane of the CCD frame 91 with respect to the lens barrel body 4 during a camera shake correcting operation.

That is, for the movable component in the Y direction at the time of a two-dimensional displacement of the CCD frame 91, the Z direction extending section 65a is bent in the Y direction in the gap Ca (see FIG. 17) between the FPC guide plate 66 and the front of the lens barrel body 4, and thereby allows the displacement of the CCD frame 91 without receiving any resistance from the FPC.

That is, when the CCD frame 91 moves in the Y direction (second direction), the Z direction extending section 65a is bent in the Y direction in the gap Ca, and thereby absorbs the amount of movement in the same Y direction.

Furthermore, for the movable component in the X direction of the CCD frame 91, the X direction extending section 65b moves in the X direction in the gap Cb between the FPC guide plate 66 and the front of the lens barrel body 4 and the Y direction side of the right angle bent section 65c is bent in the X direction (due to deformation shown by the broken line in FIG. 18) and thereby allows the displacement of the CCD frame 91 without receiving any resistance of the FPC and as a result, a two-dimensional displacement of the CCD frame 91 takes place without resistance.

That is, when the CCD frame 91 moves in the X direction (first direction), the X direction extending section 65b moves in the X direction in the gap Cb and the right angle bent section 65c is bent in the X direction, and thereby absorbs the amount of movement in the same X direction.

Furthermore, in the digital camera 1 of the present embodiment in such a configuration, first, as the power switch turns ON, the CCD frame drive section 71 drives the CCD frame 91 of the image pickup unit 88 so that the CCD frame 91 is located at the origin position together with the X slider 89, that is, the center of the light-receiving surface of the CCD 96 is located on the optical axis O2 based on outputs of the X direction sensor 69x and the Y direction sensor 69y under the control of the camera control section.

When the camera 1 is set to a camera shake correcting mode, if a photographing start signal is outputted by the release switch 14, camera shake is detected by the camera shake detecting sensor and a camera shake correcting operation is performed based on the camera shake signal. That is, the X, Y drive motors 72 and 79 are driven to rotate respectively to cause the CCD 96 on the CCD frame 91 to be displaced so as to cancel out the camera shake and cause the position on the XY plane of the CCD frame 91 to be displaced in the direction in which the camera shake is corrected at a speed corresponding to the camera shake detecting speed. Exposure of the CCD 96 is simultaneously performed and an object image signal without camera shake is outputted from the CCD 96.

As explained so far, according to the digital camera 1 of the present embodiment, since the above described bending structure is applied to the CCD connection FPC 65, it is possible to obtain a smooth displacement on the XY plane of the CCD frame 91 in which the image pickup unit 88 is mounted during a camera shake correcting operation through the above described bending operation of the CCD connection FPC 65.

With the bending structure of the CCD connection FPC 65 as described above, there is no need to provide any bent section of the FPC as in the case of the conventional image pickup apparatus and a wide space for that is unnecessary, and it is thereby possible to save space for an arrangement of the lens barrel unit and realize miniaturization of the image pickup apparatus.

Furthermore, according to the digital camera 1 of the present embodiment, the configuration of the camera shake correcting apparatus made up of the image pickup unit 88 and the CCD frame drive section 71 is extremely simple, the number of components is small and the occupied space is also small. That is, two guide shafts 86 and 92 are adopted as the guide shafts to cause the image pickup unit 88 to be two-dimensionally displaced, and such a configuration is adopted that the rotation of the X slider 89 around the shaft in the X direction and inclination of the CCD frame 91 on the XY plane can be regulated (including regulation of a backlash on the XY plane) by holding the guide shaft and through the urging structure respectively. Therefore, it is possible to realize high accuracy camera shake correction of a digital camera having a camera shake correcting function and make the camera itself more compact, and thereby reduce parts costs, too.

As described above, the image pickup apparatus of the present invention is an image pickup apparatus provided with a two-dimensionally movable image pickup device, which has a smaller space occupied by the extending section of the image pickup device connection FPC and can be used as an image pickup apparatus capable of making the apparatus more compact.

Furthermore, the camera shake correcting apparatus of the present invention can be used as a camera shake correcting apparatus in a simple configuration capable of minimizing the space occupied by the camera shake correcting mechanism while reducing the thickness in the optical axis direction.

It goes without saying that the present invention is not limited to the above described embodiment and various modifications and applications can be realized without departing from the spirit and scope of the present invention. Furthermore, the above described embodiment includes inventions in various stages and various inventions can be extracted according to appropriate combinations based on a plurality of disclosed configuration requirements. For example, even if some configuration requirements are deleted from all the configuration requirements shown in the above described one embodiment, if it is possible to solve the problems to be solved by the invention and achieve effects of the invention, the configuration with the configuration requirements deleted can be extracted as an invention. The present invention is not restricted by specific embodiments except being limited by the appended claims.

What is claimed is:

1. A camera shake correcting apparatus comprising:
  a lens barrel unit which is provided with a photographing optical system for forming an image of reflected light from an object on an image pickup device;
  a first movable member which is arranged outside the photographing optical system, and which is movable with respect to the lens barrel unit along a first axis in a plane perpendicular to an optical axis of the photographing optical system;
  a first guide member fixed to the lens barrel unit for guiding the first movable member to move along the first axis outside the photographing optical system;
  a second movable member which is provided with the image pickup device, which is connected at one end of the first movable member, and which is movable inside or in a vicinity of the photographing optical system, along a second axis in the plane that is perpendicular to the optical axis of the photographing optical system, the second axis being perpendicular to the first axis; and
  a second guide member disposed at the one end of the first movable member along the second axis for movably connecting the second movable member to the first movable member along the second axis and preventing the first movable member from rotating with respect to the lens barrel unit.

2. The camera shake correcting apparatus according to claim 1, further comprising a third guide member formed in the lens barrel unit for guiding movement of the second movable member along the second axis.

3. The camera shake correcting apparatus according to claim 2, further comprising:
  a first elastic member which urges the second movable member with respect to the first movable member, and which is disposed at the one end of the first movable member in a vicinity of the second guide member; and
  a second elastic member which urges the second movable member with respect to the first movable member, and which is disposed in a vicinity of the third guide member,
  wherein the first elastic member and the second elastic member correct a backlash of the second movable member with respect to the first movable member.

* * * * *